United States Patent
Jung et al.

(10) Patent No.: US 12,218,527 B2
(45) Date of Patent: Feb. 4, 2025

(54) METHOD AND APPARATUS FOR CONTROLLING POWER IN WIRELESS POWER TRANSFER SYSTEM

(71) Applicant: GE HYBRID TECHNOLOGIES, LLC, Niskayuna, NY (US)

(72) Inventors: Chun Kil Jung, Suwon-si (KR); Sang Youn Noh, Suwon-si (KR)

(73) Assignee: Dolby Laboratories Inc., San Francisco, CA (US)

( * ) Notice: Subject to any disclaimer, the term of this patent is extended or adjusted under 35 U.S.C. 154(b) by 0 days.

(21) Appl. No.: 15/522,773

(22) PCT Filed: Nov. 3, 2015

(86) PCT No.: PCT/KR2015/011714
§ 371 (c)(1),
(2) Date: Oct. 17, 2017

(87) PCT Pub. No.: WO2016/072706
PCT Pub. Date: May 12, 2016

(65) Prior Publication Data
US 2018/0138758 A1    May 17, 2018

(30) Foreign Application Priority Data

Nov. 3, 2014 (KR) .......... 10-2014-0151175
Dec. 19, 2014 (KR) .......... 10-2014-0184408

(51) Int. Cl.
*H02J 50/80* (2016.01)
*H02J 7/00* (2006.01)
(Continued)

(52) U.S. Cl.
CPC .............. *H02J 50/80* (2016.02); *H02J 50/12* (2016.02); *H02J 50/90* (2016.02);
(Continued)

(58) Field of Classification Search
CPC ................................. H02J 50/00; H02J 50/80
See application file for complete search history.

(56) References Cited

U.S. PATENT DOCUMENTS

| 8,823,319 B2 | 9/2014 | Von Novak, III et al. |
| 9,306,401 B2 * | 4/2016 | Lee .......................... H02J 7/00 |
| | (Continued) | |

FOREIGN PATENT DOCUMENTS

| KR | 1020110137393 | 12/2011 |
| KR | 1020130033867 | 4/2013 |
| | (Continued) | |

OTHER PUBLICATIONS

"Qi System Description Wireless Power Transfer", Wireless Power Consortium, vol. 1:Low Power, Part 1: Interface Definition, Version 1.0.1, Oct. 2010, 88 pages (Year: 2010).*
(Continued)

*Primary Examiner* — Drew A Dunn
*Assistant Examiner* — Tynese V McDaniel
(74) *Attorney, Agent, or Firm* — DeLizio, Peacock, Lewin & Guerra, LLP

(57) ABSTRACT

A method and an apparatus for controlling power in a wireless power transfer system are disclosed. A method for controlling power of a main device in a wireless power transfer system comprises the steps of: receiving information necessary for power control from a plurality of peripheral devices; identifying the actual power consumption state of the plurality of peripheral devices on the basis of the information necessary for power control, and determining a reference peripheral device on the basis of the actual power consumption state; and determining output power in consideration of the reference peripheral device.

19 Claims, 21 Drawing Sheets

(51) Int. Cl.
  *H02J 50/12* (2016.01)
  *H02J 50/40* (2016.01)
  *H02J 50/90* (2016.01)

(52) U.S. Cl.
  CPC ....... *H02J 7/00036* (2020.01); *H02J 7/00047* (2020.01); *H02J 50/402* (2020.01)

(56) References Cited

U.S. PATENT DOCUMENTS

| | | | |
|---|---|---|---|
| 9,536,656 | B2 | 1/2017 | Oettinger et al. |
| 10,868,443 | B2 | 12/2020 | Baarman et al. |
| 11,381,121 | B2 | 7/2022 | Jung et al. |
| 2007/0228833 | A1 | 10/2007 | Stevens et al. |
| 2007/0273486 | A1* | 11/2007 | Shiotsu ............ H04B 5/02 340/10.34 |
| 2009/0309550 | A1 | 12/2009 | Liu |
| 2010/0244576 | A1 | 9/2010 | Hillan et al. |
| 2010/0253281 | A1 | 10/2010 | Li |
| 2010/0259217 | A1 | 10/2010 | Baarman et al. |
| 2010/0286864 | A1 | 11/2010 | Kawauchi et al. |
| 2010/0289341 | A1 | 11/2010 | Ozaki et al. |
| 2011/0057606 | A1 | 3/2011 | Saunamaki |
| 2011/0115303 | A1 | 5/2011 | Baarman et al. |
| 2011/0227420 | A1 | 9/2011 | Urano |
| 2011/0241437 | A1 | 10/2011 | Kanno |
| 2011/0260682 | A1 | 10/2011 | Low et al. |
| 2011/0298297 | A1 | 12/2011 | Van Wageningen et al. |
| 2012/0013198 | A1 | 1/2012 | Uramoto et al. |
| 2012/0149307 | A1* | 6/2012 | Terada ............ H02J 7/025 455/66.1 |
| 2012/0169137 | A1 | 7/2012 | Lisi et al. |
| 2012/0299373 | A1 | 11/2012 | Yoshida |
| 2012/0319646 | A1 | 12/2012 | Kamata |
| 2013/0029606 | A1 | 1/2013 | Wang et al. |
| 2013/0057078 | A1* | 3/2013 | Lee ............ H02J 50/12 307/104 |
| 2013/0134927 | A1 | 5/2013 | Park et al. |
| 2013/0162200 | A1 | 6/2013 | Terry et al. |
| 2013/0207599 | A1* | 8/2013 | Ziv ............ H02J 5/005 320/108 |
| 2013/0214611 | A1 | 8/2013 | Bae |
| 2013/0221915 | A1* | 8/2013 | Son ............ H02J 7/025 320/108 |
| 2013/0313911 | A1 | 11/2013 | Bae |
| 2014/0009109 | A1 | 1/2014 | Lee et al. |
| 2014/0015330 | A1* | 1/2014 | Byun ............ H05K 999/99 307/104 |
| 2014/0015335 | A1* | 1/2014 | Lee ............ H01F 38/14 307/104 |
| 2014/0084701 | A1 | 3/2014 | Bae |
| 2014/0139034 | A1 | 5/2014 | Sanker et al. |
| 2014/0265615 | A1 | 9/2014 | Kim et al. |
| 2014/0285008 | A1 | 9/2014 | Azancot et al. |
| 2014/0308996 | A1* | 10/2014 | Byun ............ H02J 17/00 455/573 |
| 2014/0327319 | A1 | 11/2014 | Byun et al. |
| 2014/0375256 | A1 | 12/2014 | Lee et al. |
| 2015/0001936 | A1 | 1/2015 | Eguchi |
| 2015/0008760 | A1 | 1/2015 | Bae |
| 2015/0137748 | A1 | 5/2015 | Kim et al. |
| 2015/0189363 | A1 | 7/2015 | Hsu et al. |
| 2015/0194814 | A1* | 7/2015 | Taylor ............ H02J 50/60 307/104 |
| 2015/0380972 | A1* | 12/2015 | Fort ............ A61N 1/3787 320/108 |
| 2016/0336804 | A1 | 11/2016 | Son et al. |
| 2017/0070101 | A1 | 3/2017 | Kim et al. |
| 2017/0250574 | A1 | 8/2017 | Min et al. |
| 2017/0302086 | A1 | 10/2017 | Kwan et al. |
| 2017/0338685 | A1 | 11/2017 | Jung et al. |
| 2018/0034305 | A1 | 2/2018 | Lee et al. |
| 2022/0337099 | A1 | 10/2022 | Jung et al. |

FOREIGN PATENT DOCUMENTS

| | | |
|---|---|---|
| KR | 1020130059697 | 6/2013 |
| KR | 1020130101246 | 9/2013 |
| KR | 1020130111510 A1 | 10/2013 |
| KR | 1020140007273 A | 1/2014 |
| KR | 1020140031709 | 3/2014 |
| KR | 1020140077591 | 6/2014 |
| KR | 1020140114924 A | 9/2014 |
| KR | 1020140124575 A | 10/2014 |
| KR | 1020140131216 | 11/2014 |
| WO | 2010057224 A1 | 5/2010 |
| WO | 2013035873 A1 | 3/2013 |
| WO | 2013112526 | 8/2013 |
| WO | 2016072706 | 5/2016 |
| WO | 2016072707 | 5/2016 |
| WO | 2016072709 | 5/2016 |
| WO | 2016099032 | 6/2016 |
| WO | WO-2024062770 A1 * | 3/2024 |

OTHER PUBLICATIONS

WO-2024062770 Translation, Shimura (Year: 2024).*
"PCT Application No. PCT/KR2015/011714 International Preliminary Report on Patentability", May 18, 2017, 11 pages.
"PCT Application No. PCT/KR2015/011714 International Search Report and Written Opinion", Feb. 29, 2016, 11 pages.
"PCT Application No. PCT/KR2015/011715 International Preliminary Report on Patentability", May 18, 2017, 8 pages.
"PCT Application No. PCT/KR2015/011715 International Search Report and Written Opinion", Feb. 16, 2016, 8 pages.
"PCT Application No. PCT/KR2015/011717 International Preliminary Report on Patentability", May 9, 2017, 8 pages.
"PCT Application No. PCT/KR2015/011717 International Search Report and Written Opinion", Feb. 29, 2016, 9 pages.
"PCT Application No. PCT/KR2015/012035 International Preliminary Report on Patentability", Jun. 29, 2017, 10 pages.
"PCT Application No. PCT/KR2015/012035 International Search Report and Written Opinion", Feb. 19, 2016, 11 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/535,400 Final Office Action", Jun. 12, 2019, 11 pages.
"U.S. Appl. No. 15/535,400 Office Action", Jan. 25, 2019, 18 pages.
"U.S. Appl. No. 15/535,400 Office Action", May 22, 2020, 15 pages.
"U.S. Appl. No. 15/535,400 Final Office Action", Oct. 14, 2020, 16 pages.
"Korean Application No. 10-2014-181585 Office Action", Dec. 1, 2020, 7 pages.
"Korean Application No. 10-2014-181585 Final Office Action", Jun. 23, 2021, 3 pages.
"U.S. Appl. No. 15/535,400 Office Action", Apr. 19, 2021, 9 pages.
"Korean Application No. 10-2014-0184408 Office Action", Jan. 12, 2021, 6 pages.
"Korean Application No. 10-2021-0125899 Notification of Reason for Refusal", Jan. 25, 2022, 5 pages.
"Korean Application No. 10-2021-0148176 Notification of Reason for Refusal", Feb. 21, 2022, 7 pages.
"U.S. Appl. No. 17/809,603 Non Final Office Action", Nov. 22, 2022, 16 pages.
"U.S. Appl. No. 17/809,603 Non Final Office Action", Mar. 22, 2023, 7 pages.
"Korea patent application No. 10-2022-0142101 Request for the Submission of an Opinion", Aug. 28, 2023, 4 pages.
"Korea patent application No. 10-2022-0142101 Notice of Final Rejection", Feb. 27, 2024, 3 pages.

* cited by examiner

FIG. 11
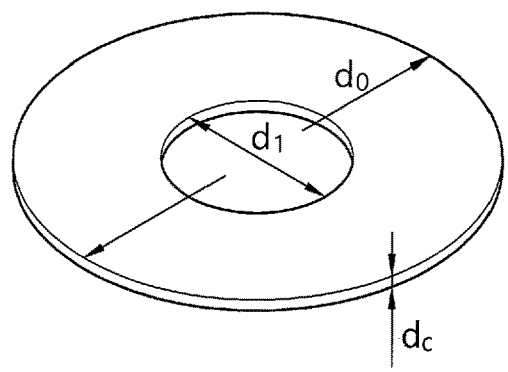
(a)
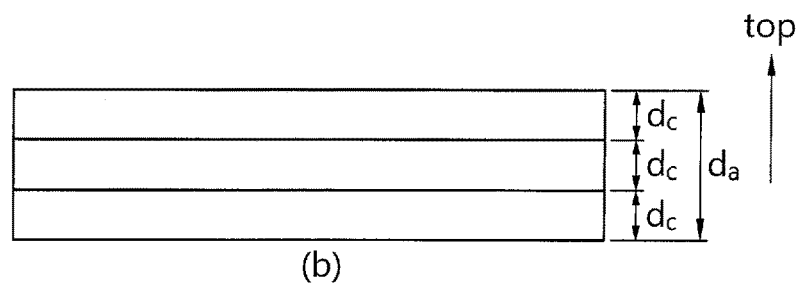
(b)
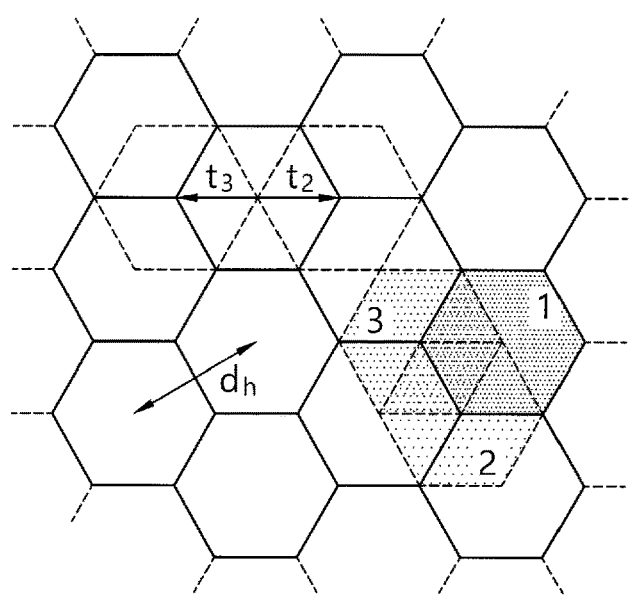
(c)

• Pressure sensor and/or temperature sensor

METHOD AND APPARATUS FOR CONTROLLING POWER IN WIRELESS POWER TRANSFER SYSTEM

CROSS-REFERENCE TO RELATED APPLICATIONS

This application is a national stage of International Application No. PCT/KR2015/011714, filed Nov. 3, 2015, which claims the benefit of priority to Korean Application No. 10-2014-0151175, filed Nov. 3, 2014 and Korean Application No. 10-2014-0184408, filed Dec. 19, 2014 in the Korean Intellectual Property Office, the disclosures of which are incorporated herein by reference.

TECHNICAL FIELD

A technical field relates to power control of a wireless power transmission system which transmits or receives power wirelessly.

BACKGROUND ART

A wireless power transmission system includes a wireless power transmission apparatus which wirelessly transmits electrical energy and a wireless power reception apparatus which receives electrical energy from a wireless power transmission apparatus. The wireless power transmission system may be applied to a local computing environment.

If the wireless power transmission system is used, for example, by simply placing a mobile phone on a charging pad without connecting the mobile phone to a separate charging connector, the battery of the mobile phone can be charged.

A method for wirelessly transferring electrical energy may be divided into a magnetic induction method, a magnetic resonance method and an electromagnetic method depending on the principle that electrical energy is transferred.

The magnetic induction method is a method for transferring electrical energy using a phenomenon in which electricity is induced between the coil of a transmission unit and the coil of a reception unit.

The magnetic resonance method is a method for generating, by the coil of a transmission unit, a magnetic field that vibrates in a resonant frequency and intensively transferring energy to the coil of a reception unit designed to have the same resonant frequency.

The electromagnetic method is a method for receiving, by a reception unit, electromagnetic waves generated by a transmission unit using several antennas and converting the electromagnetic waves into electrical energy.

Meanwhile, a wireless power transmission technology may be divided into a flexibly coupled wireless power transfer technology (hereinafter referred to as a "flexibly coupled technology") and a tightly coupled wireless power transfer technology (hereinafter referred to as a "tightly coupled technology") depending on the type to strength of magnetic resonance coupling between a transmission unit coil and a reception unit coil.

In this case, in the case of the "flexibly coupled technology", concurrent multiple charging may be possible because magnetic resonance coupling may be formed between a single transmission unit resonator and a plurality of reception unit resonators.

In this case, the "tightly coupled technology" may be a technology in which only power transfer (one-to-one power transmission) between a single transmission unit coil and a reception unit coil is possible.

As an example in which such a wireless power transmission and charging system has been applied to a wireless power transmission network, such as a local computing environment, there was disclosed Conventional Technology 3 and Conventional Technology 5 described in "Prior Art Document."

However, local computing environments according to Conventional Technology 3 and Conventional Technology 5 do not provide a method for controlling a short-distance field distance depending on an environment.

DISCLOSURE

Technical Problem

There are proposed a wireless power transmission and charging system and proposed an improved configuration of the wireless power transmission and charging system.

Furthermore, there are provided a method and apparatus which perform power control depending on the state of a peripheral device which receives power in a wireless power transmission system.

Technical Solution

A method for controlling, by a main device, power in a wireless power transmission system according to an embodiment includes the steps of receiving information necessary for power control from the plurality of peripheral devices, determining a reference peripheral device based on the information necessary for power control, and determining output power by taking into consideration the reference peripheral device.

A method for controlling, by a main device, power in a wireless power transmission system according to another embodiment includes the steps of receiving information about a current charging level from the plurality of peripheral devices and determining a reference peripheral device based on the information about the current charging level and determining output power based on the power control parameter of the reference peripheral device.

A power control apparatus of a main device in a wireless power transmission system according to an embodiment includes a communication unit which receives information necessary for power control from the plurality of peripheral devices and a control unit which determines a reference peripheral device based on the information necessary for power control and determines output power by taking into consideration the reference peripheral device.

A power control apparatus of a main device in a wireless power transmission system according to another embodiment includes a communication unit which receives information about a current charging level from the plurality of peripheral devices and a control unit which determines a reference peripheral device based on the information about the current charging level and determines output power based on the power control parameter of the reference peripheral device.

Advantageous Effects

In accordance with an embodiment of the present invention, stably and efficient wireless power transmission and charging are possible.

Furthermore, in accordance with embodiments of the present invention, power control can be adaptively performed depending on the state of a peripheral device which receives power in a wireless power transmission system.

DESCRIPTION OF DRAWINGS

FIG. 11 is a diagram showing an example in which the primary coil array of the power transmission unit is configured.

BEST MODE

Hereinafter, embodiments of the present invention are described in detail with reference to the accompanying drawings.

Figure 1:
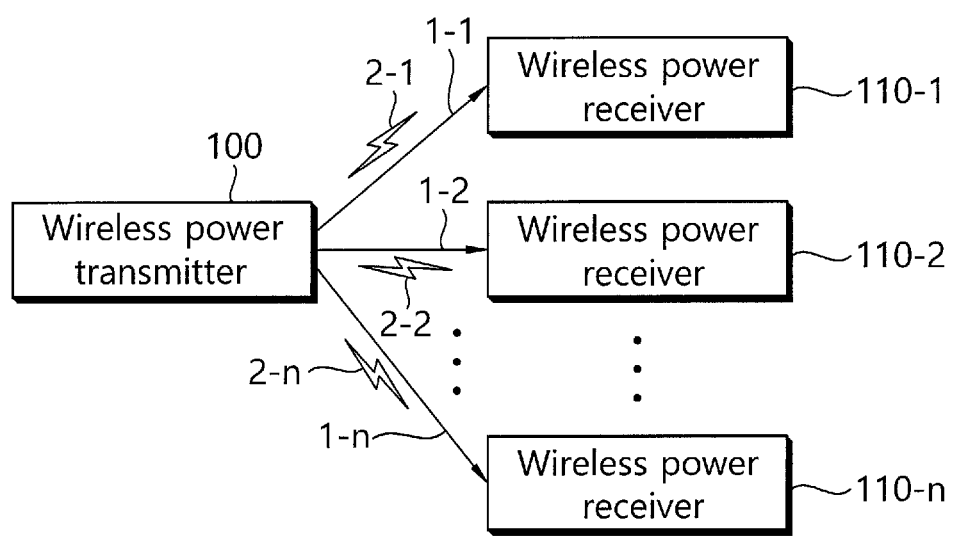
FIG. 1 is a diagram for illustrating an overall concept of a wireless power transmission system.

FIG. 1 is a diagram for illustrating an overall concept of a wireless power transmission system.

Referring to FIG. 1, a wireless charging system may wirelessly transmit power 1-1, 1-2 and 1-$n$ from a wireless power transmitter 100 to at least one wireless power receivers 110-1, 110-2 and 110-$n$, respectively. More specifically, the wireless power transmitter 100 may wirelessly transmit the power 1-1, 1-2 and 1-$n$ to only authenticated wireless power receivers on which a specific authentication procedure has been performed.

The wireless power transmitter 100 may establish electrical connection with the wireless power receivers 110-1, 110-2 and 110-$n$. For example, the wireless power transmitter 100 may transmit wireless power of an electromagnetic wave form to the wireless power receivers 110-1, 110-2 and 110-$n$.

Furthermore, the wireless power transmitter 100 may perform bi-directional communication with the wireless power receivers 110-1, 110-2 and 110-$n$. In this case, the wireless power transmitter 100 and the wireless power receivers 110-1, 110-2 and 110-$n$ may process or transmit or receive packets 2-1, 2-2 and 2-$n$ including a specific frame. The aforementioned frame is described in more detail below. The wireless power receiver may be implemented using a mobile communication terminal, a $P_D A$, a PMP or a smart phone.

Furthermore, the wireless power transmitter 100 may wirelessly provide power to the plurality of wireless power receivers 110-1, 110-2 and 110-$n$. For example, the wireless power transmitter 100 may transmit power to the plurality of wireless power receivers 110-1, 110-2 and 110-$n$ through a resonant method. If the wireless power transmitter 100 adopts the resonant method, the distance between the wireless power transmitter 100 and the plurality of wireless power receivers 110-1, 110-2 and 110-$n$ may preferably be 30 m or less. Furthermore, if the wireless power transmitter 100 adopts the electromagnetic induction method, the distance between the wireless power transmitter 100 and the plurality of wireless power receivers 110-1, 110-2 and 110-$n$ may preferably be 10 cm or less.

Furthermore, the wireless power transmitter 100 may include display means, such as a display, and may display the state of each of the wireless power receivers 110-1, 110-2 and 110-$n$ based on a message received from each of the wireless power receivers 110-1, 110-2 and 110-$n$. Furthermore, the wireless power transmitter 100 may also display the time expected until the changing of each of the wireless power receivers 110-1, 110-2 and 110-$n$ is completed.

Furthermore, the wireless power transmitter 100 may transmit a control signal to each of the wireless power receivers 110-1, 110-2 and 110-$n$ so that each of the wireless power receivers 110-1, 110-2 and 110-$n$ disables a wireless charging function. The wireless power receiver that has received the control signal to disable the wireless charging function from the wireless power transmitter 100 may disable the wireless charging function.

Each of the wireless power receivers 110-1, 110-2 and 110-$n$ may receive wireless power from the wireless power transmitter 100 and may perform the charging of a battery embedded therein. Furthermore, each of the wireless power receivers 110-1, 110-2 and 110-*n* may transmit a signal that requests wireless power transmission, information necessary to receive wireless power, wireless power receiver state information or control information of the wireless power transmitter 100 to the wireless power transmitter 100. The information of the transmission signal is described in more detail below.

Furthermore, each of the wireless power receivers 110-1, 110-2 and 110-*n* may transmit a message indicative of a charging state to the wireless power transmitter 100.

Figure 2:
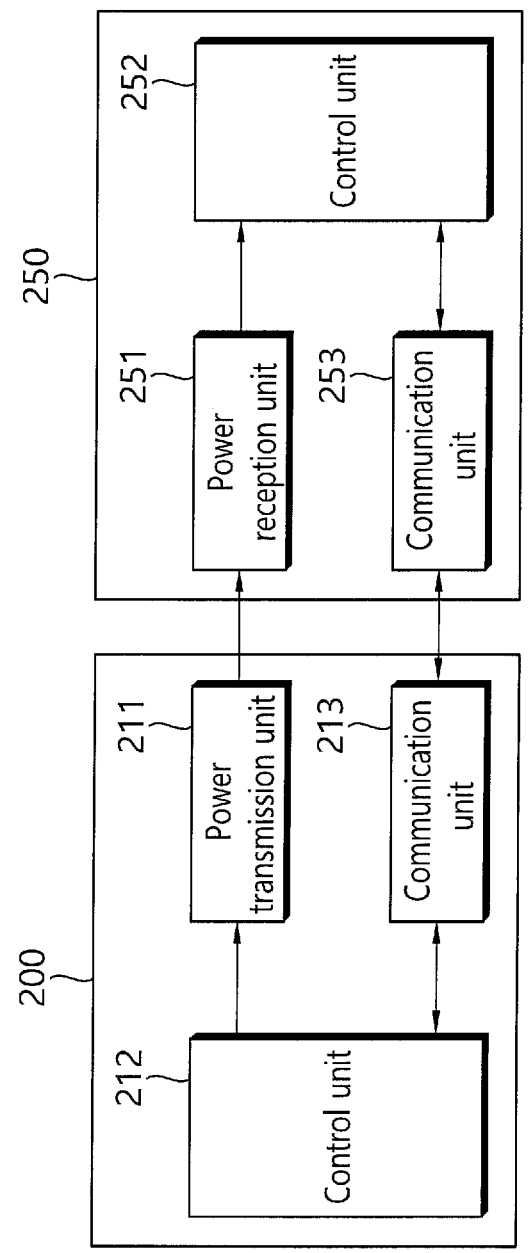
FIG. 2 is a block diagram of a wireless power transmitter and a wireless power receiver according to an embodiment of the present invention.

FIG. 2 is a block diagram of a wireless power transmitter and a wireless power receiver according to an embodiment of the present invention.

Referring to FIG. 2, the wireless power transmitter 200 may include a power transmission unit 211, a control unit 212, and a communication unit 213. Furthermore, the wireless power receiver 250 may include a power reception unit 251, a control unit 252, and a communication unit 253.

The power transmission unit 211 may provide power required by the wireless power transmitter 200 and wirelessly provide power to the wireless power receiver 250. In this case, the power transmission unit 211 may supply power in the form of an AC waveform, and may also convert power into an AC waveform using an inverter while supplying the power in the form of a DC waveform and supply the power in the form of an AC waveform. The power transmission unit 211 may be implemented in the form of an embedded battery or may be implemented in the form of a power reception interface so that it receives external power and supplies the received power to other elements. Those skilled in the art will easily understand that the power transmission unit 211 has no limit to any means if the means can provide power of a specific AC waveform.

Furthermore, the power transmission unit 211 may provide an AC waveform of an electromagnetic wave form to the wireless power receiver 250. The power transmission unit 211 may further include a loop coil. Accordingly, the power transmission unit 211 may transmit or receive specific electromagnetic waves. If the power transmission unit 211 is implemented using the loop coil, inductance L of the loop coil may be changed. Meanwhile, those skilled in the art will easily understand that the power transmission unit 211 has no limit to any means if the means can transmit or receive electromagnetic waves.

The control unit 212 may control an overall operation of the wireless power transmitter 200. The control unit 212 may control an overall operation of the wireless power transmitter 200 using an algorithm, program or application that is required for control of data read from a storage unit (not shown). The control unit 212 may be implemented in a form, such as a CPU, a microprocessor or a mini-computer. A detailed operation of the control unit 212 is described in more detail below.

The communication unit 213 may perform communication with the wireless power receiver 250 using a specific method. The communication unit 213 may perform communication with the communication unit 253 of the wireless power receiver 250 using near field communication (NFC), Zigbee communication, infrared communication or visible ray communication. The communication unit 213 according to an embodiment of the present invention may perform communication using a Zigbee communication method according to the IEEE802.15.4 method. Furthermore, the communication unit 213 may use a carrier sense multiple access with collision avoidance (CSMA/CA) algorithm. A configuration regarding the selection of a frequency and channel used by the communication unit 213 is described in more detail below. Meanwhile, the aforementioned communication method is only illustrative, and the scope of right of the present invention is not restricted by a specific communication method performed by the communication unit 213.

Meanwhile, the communication unit 213 may transmit a signal for information about the wireless power transmitter 200. In this case, the communication unit 213 may unicast, multicast or broadcast the signal.

The communication unit 213 may receive power information from the wireless power receiver 250. In this case, the power information may include at least one of the capacity, the amount of remaining battery power, the charging number, the amount of power used, the battery capacity and the battery ratio of the wireless power receiver 250. Furthermore, the communication unit 213 may transmit a charging function control signal that controls the charging function of the wireless power receiver 250. The charging function control signal may be a control signal that controls the power reception unit 251 of a specific wireless power receiver 250 so that the specific wireless power receiver 250 enables or disables its charging function.

Furthermore, the communication unit 213 may receive a signal from another wireless power transmitter (not shown) in addition to the wireless power receiver 250. For example, the communication unit 213 may receive a notice signal of a frame from another wireless power transmitter.

Meanwhile, in FIG. 2, the power transmission unit 211 and the communication unit 213 have been illustrated as being different hardware and the wireless power transmitter 200 has been illustrated as performing communication in an out-band form, but this is illustrative. In the present invention, the power transmission unit 211 and the communication unit 213 may be implemented in one piece of hardware, so the wireless power transmitter 200 can perform communication in an in-band form.

The wireless power transmitter 200 and the wireless power receiver 250 may transmit or receive a variety of types of signals. Accordingly, the joining of the wireless power receiver 250 to a wireless power network controlled by the wireless power transmitter 200 and a charging process through wireless power transmission or reception may be performed. The aforementioned process is described in more detail below.

Figure 3:
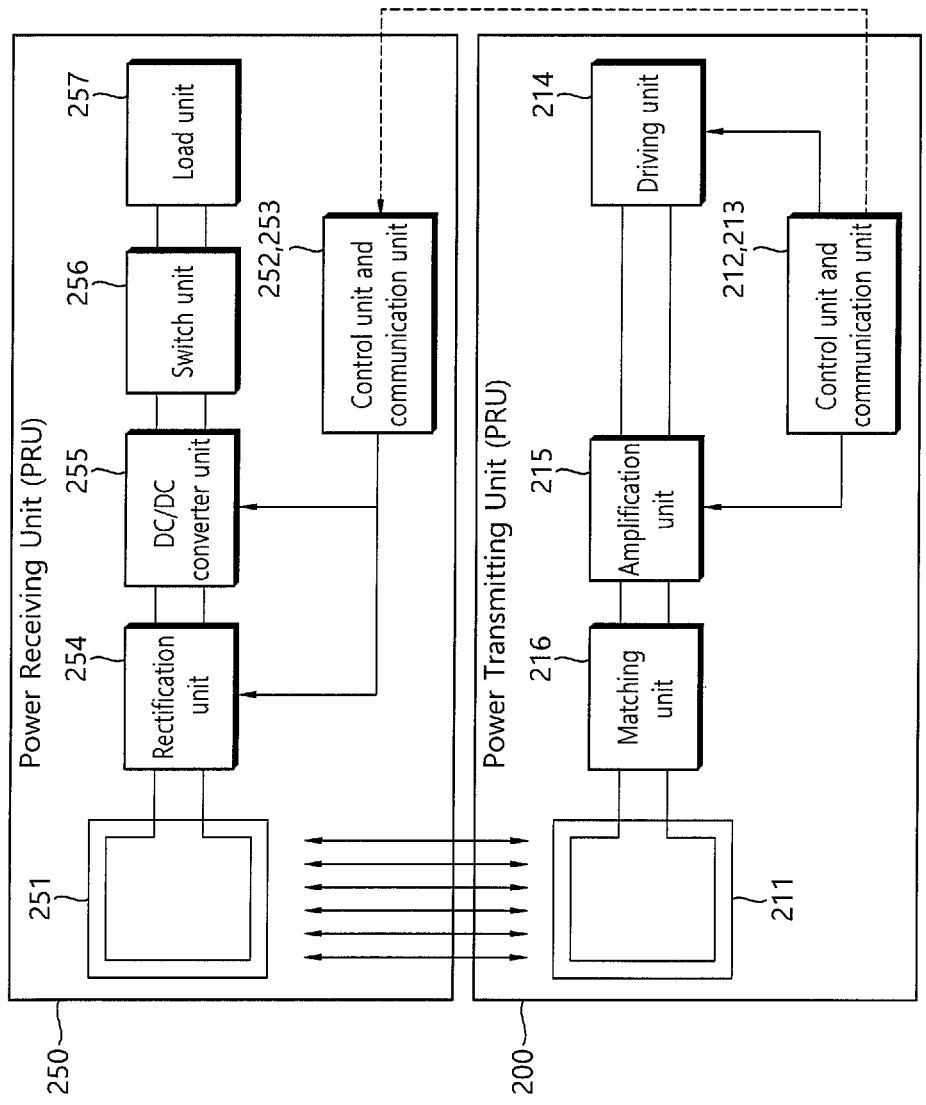
FIG. 3 is a detailed block diagram of the wireless power transmitter and the wireless power receiver according to an embodiment of the present invention.

Furthermore, in FIG. 2, the configurations of the wireless power transmitter 200 and the wireless power receiver 250 have been illustrated in brief, but FIG. 3 illustrates detailed configurations of the wireless power transmitter 200 and the wireless power receiver 250 and a detailed description thereof is given later.

FIG. 3 is a detailed block diagram of the wireless power transmitter and the wireless power receiver according to an embodiment of the present invention.

Referring to FIG. 3, the wireless power transmitter 200 may include the power transmission unit 211, the control unit and communication unit 212, 213, a driving unit 214, an amplification unit 215 and a matching unit 216. The wireless power receiver 250 may include the power reception unit 251, the control unit and communication unit 252, 253, a rectification unit 254, a DC/DC converter unit 255, a switch unit 256 and a load unit 257.

The driving unit 214 may output DC power having a preset voltage value. The voltage value of the DC power output by the driving unit 214 may be controlled by the control unit and communication unit 212, 213.

A DC current output by the driving unit 214 may be output to the amplification unit 215. The amplification unit 215 may amplify the DC current to a preset gain. Furthermore, the amplification unit 215 may convert DC power into an AC based on a signal received from the control unit and communication unit 212, 213. Accordingly, the amplification unit 215 may output AC power.

The matching unit 216 may perform impedance matching. For example, the matching unit 216 may control output power so that it becomes high efficiency or high output by adjusting impedance viewed from the matching unit 216. The matching unit 216 may adjust impedance based on control of the control unit and communication unit 212, 213. The matching unit 216 may include at least one of a coil and a capacitor. The control unit and communication unit 212, 213 may control a connection state with at least one of the coil and the capacitor. Accordingly, impedance matching may be performed.

The power transmission unit 211 may transmit input AC power to the power reception unit 251. The power transmission unit 211 and the power reception unit 251 may be implemented using resonant circuits having the same resonant frequency. For example, the resonant frequency may be determined to be 6.78 MHz. The control unit and communication unit 212, 213 may perform communication with the control unit and communication unit 252, 253 of the wireless power receiver 250.

Meanwhile, the power reception unit 251 may receive charging power from the power transmission unit 211.

The rectification unit 254 may rectify wireless power, received by the power reception unit 251, in a DC form and may be implemented in the form of a bridge diode, for example. The DC/DC converter unit 255 may convert the rectified power into a preset gain. For example, the DC/DC converter unit 255 may convert the rectified power so that the voltage of an output terminal 259 becomes 5 V. Meanwhile, a minimum value and maximum value of a voltage that may be applied to the front end 258 of the DC/DC converter unit 255 may be previously set.

The switch unit 256 may connect the DC/DC converter unit 255 and the load unit 257. The switch unit 256 may maintain its ON/OFF state under control of the control unit 252. The load unit 257 may store converted power received from the DC/DC converter unit 255 if the switch unit 256 is the ON state.

Figure 4:
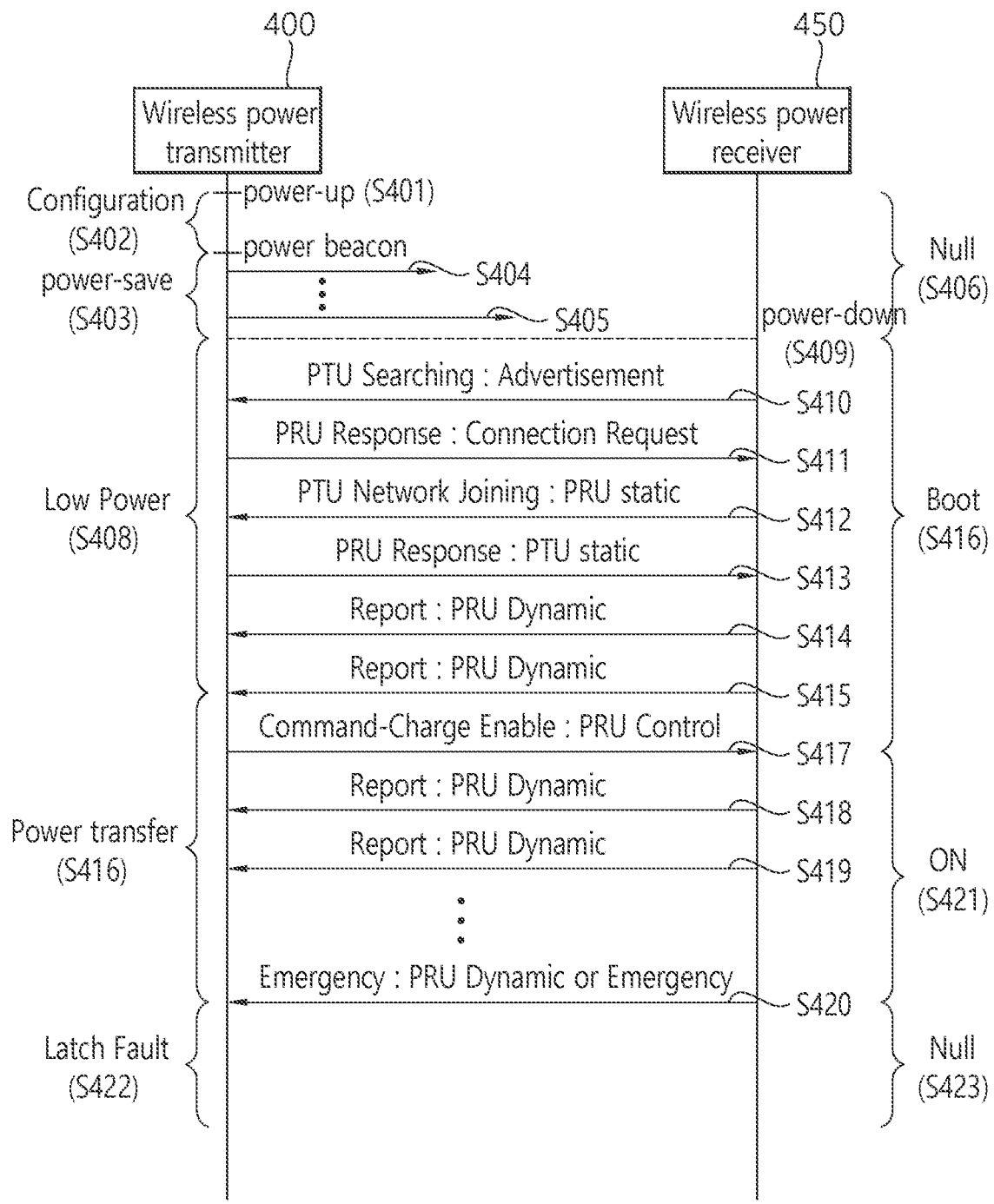
FIG. 4 is a flowchart for illustrating an operation of a wireless power transmitter and a wireless power receiver according to an embodiment of the present invention.

FIG. 4 is a flowchart for illustrating an operation of a wireless power transmitter and a wireless power receiver according to an embodiment of the present invention.

Referring to FIG. 4, the wireless power transmitter 400 may apply power (S401). When the power is applied, the wireless power transmitter 400 may configure an environment (S402).

The wireless power transmitter 400 may enter a power save mode (S403). In the power save mode, the wireless power transmitter 400 may apply heterogeneous power beacons 404 and 405 for detection in respective cycles. For example, as shown in FIG. 4, the wireless power transmitter 400 may apply the power beacons for detection. The power values of the power beacons 404 and 405 for detection may have different sizes. Some or all of the power beacons 404 and 405 for detection may have the amount of power and an application time which can drive the communication unit of a wireless power receiver 450. For example, the wireless power receiver 450 may perform communication with the wireless power transmitter 400 by driving its communication unit by some or all of the power beacons 404 and 405 for detection. The state may be called a null state.

The wireless power transmitter 400 may detect a change of a load attributable to the disposition of the wireless power receiver 450. The wireless power transmitter 400 may enter a low power mode (S409). The low power mode may be a mode in which the wireless power transmitter applies detection power periodically or aperiodically. Meanwhile, the wireless power receiver 450 may drive the communication unit based on power received from the wireless power transmitter 400 (S409).

The wireless power receiver 450 may transmit a power transmitter unit (PTU) searching signal to the wireless power transmitter 400 (S410). The wireless power receiver 450 may transmit the PTU searching signal as a BLE-based advertisement signal. The wireless power receiver 450 may transmit the PTU searching signal periodically or aperiodically or may transmit the PTU searching signal until it receives a power receiver unit (PRU) response signal from the wireless power transmitter 400 or a predetermined time is reached.

When the PTU searching signal is received from the wireless power receiver 450, the wireless power transmitter 400 may transmit a PRU response signal (S411). In this case, the PRU response signal may establish connection between the wireless power transmitter 400 and the wireless power receiver 450.

The wireless power receiver 450 may transmit a PRU static signal (S412). In this case, the PRU static signal may be a signal indicative of the state of the wireless power receiver 450, and may request to join a wireless power network controlled by the wireless power transmitter 400.

The wireless power transmitter 400 may transmit a PTU static signal (S413). The PTU static signal transmitted by the wireless power transmitter 400 may be a signal indicative of the capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal (S414, S415).

The PRU dynamic signal may include at least one piece of parameter information measured by the wireless power receiver 450. For example, the PRU dynamic signal may include information about a voltage at the rear end of the rectification unit of the wireless power receiver 450. The state of the wireless power receiver 450 may be called a boot state.

The wireless power transmitter 400 may enter a power transfer mode (S416). The wireless power transmitter 400 may transmit a PRU command signal, that is, a command signal that enables the wireless power receiver 450 to perform charging (S417). In the power transfer mode, the wireless power transmitter 400 may transmit charging power.

The PRU command signal transmitted by the wireless power transmitter 400 may include information that enables or disables the charging of the wireless power receiver 450 and permission information. The PRU command signal may be transmitted if the wireless power transmitter 400 changes the state of the wireless power receiver 450 or in a predetermined cycle (e.g., a cycle of 250 ms). The wireless power receiver 400 may change its configuration in response to the PRU command signal, and may transmit a PRU dynamic signal for reporting the state of the wireless power receiver 450 (S418, S419). The PRU dynamic signal transmitted by the wireless power receiver 450 may include at least one of a voltage, a current, a wireless power receiver state and temperature information. The state of the wireless power receiver 450 may be called an ON state.

The wireless power receiver 450 may receive the PRU command signal and perform charging. For example, if the wireless power transmitter 400 has power enough to charge the wireless power receiver 450, it may transmit the PRU command signal that enables charging. Meanwhile, the PRU command signal may be transmitted whenever a charging state is changed. The PRU command signal may be transmitted every 250 ms, for example or may be transmitted when there is a change of a parameter. The PRU command signal may be set so that it is transmitted on a predetermined critical time (e.g., within one second) although the parameter is not changed.

Meanwhile, the wireless power receiver 450 may detect the generation of an error. The wireless power receiver 450 may transmit a warning signal to the wireless power transmitter 400 (S420). The warning signal may be transmitted as a PRU dynamic signal or may be transmitted as a PRU warning signal. For example, the wireless power receiver 450 may incorporate an error situation into a PRU warning information field of Table 4 and transmit the error situation to the wireless power transmitter 400. Alternatively, the wireless power receiver 450 may transmit a sole warning signal indicative of an error situation to the wireless power transmitter 400. When the wireless power transmitter 400 receives the PRU warning signal, it may enter a latch fault mode (S422). The wireless power receiver 450 may enter a null state (S423).

Figure 5:
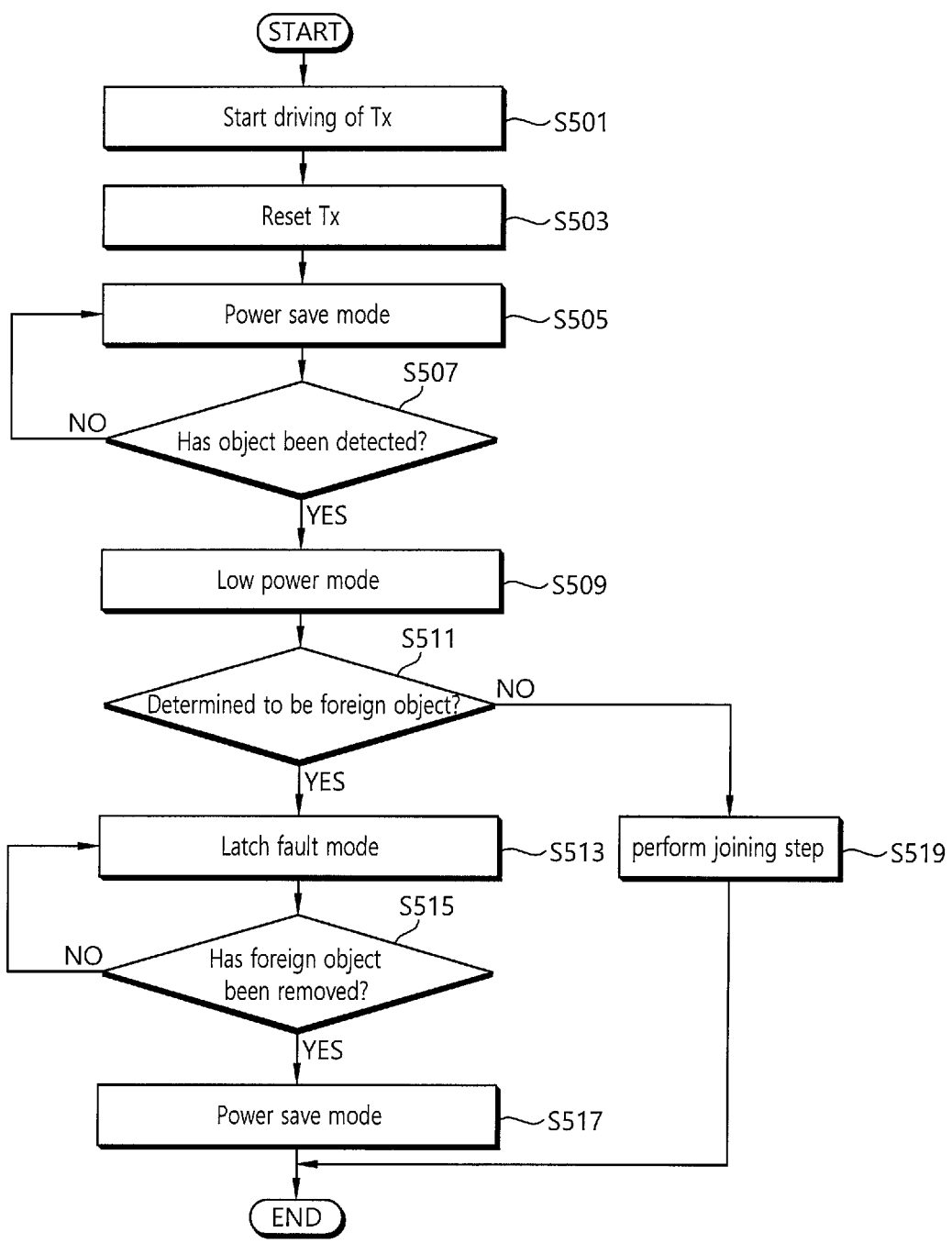
FIG. 5 is a flowchart illustrating an operation of the wireless power transmitter and the wireless power receiver according to another embodiment of the present invention.

FIG. 5 is a flowchart illustrating an operation of the wireless power transmitter and the wireless power receiver according to another embodiment of the present invention.

Figure 6:
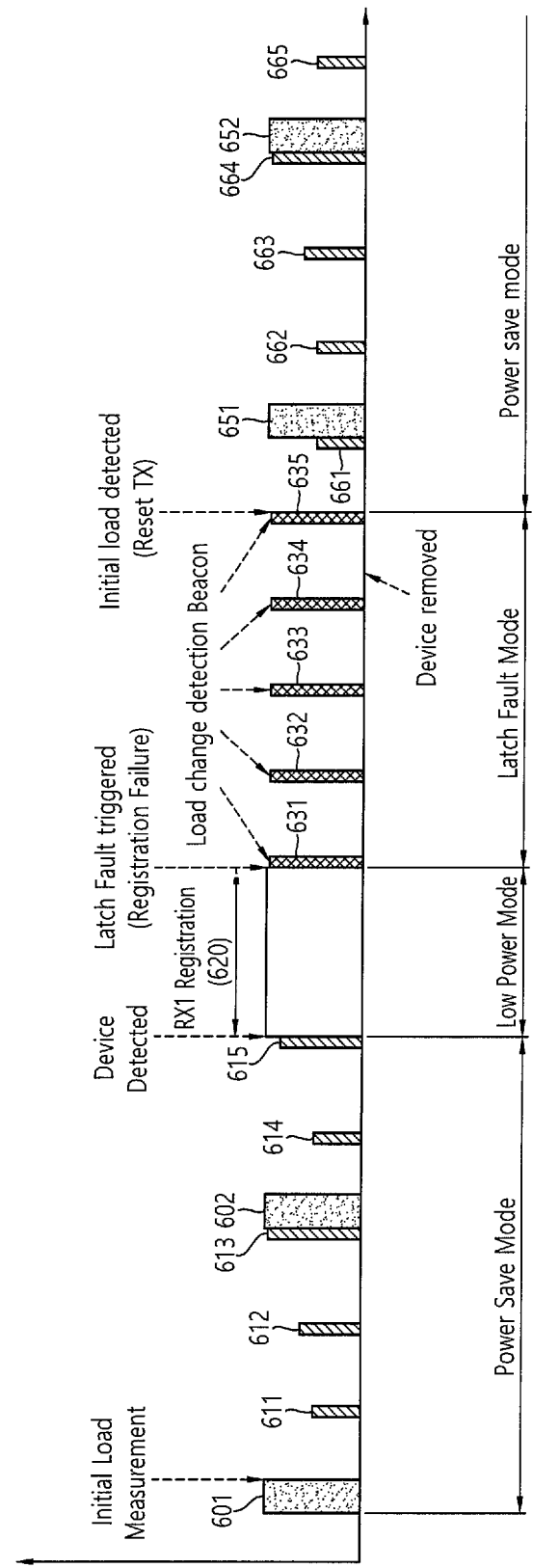
FIG. 6 is a graph for the time axis of the amount of power applied by the wireless power transmitter of FIG. 5 according to an embodiment.

The control method of FIG. 5 is described in more detail with reference to FIG. 6. FIG. 6 is a graph for the time axis of the amount of power applied by the wireless power transmitter of FIG. 5 according to an embodiment.

Referring to FIG. 5, the wireless power transmitter may start driving (S501). Furthermore, the wireless power transmitter may reset initial setting (S503). The wireless power transmitter may enter the power save mode (S505). In this case, the power save mode may be a section in which the wireless power transmitter applies heterogeneous power having a different amount of power to the power transmission unit. For example, the wireless power transmitter may be a section in which second detection power 601 and 602 and third detection power 611, 612, 613, 614 and 615 are applied to the power transmission unit in FIG. 6. In this case, the wireless power transmitter may periodically apply the second detection power 601 and 602 in a second cycle. If the second detection power 601 and 602 is applied, the wireless power transmitter may apply the second detection power 601 and 602 during a second period.

The wireless power transmitter may periodically apply the third detection power 611, 612, 613, 614 and 615 in a third cycle. If the third detection power 611, 612, 613, 614 and 615 is applied, the wireless power transmitter may apply the third detection power 611, 612, 613, 614 and 615 during a third period. Meanwhile, the third detection power 611, 612, 613, 614 and 615 has been illustrated as having different power values, but the power values of the third detection power 611, 612, 613, 614 and 615 may be different or the same.

The wireless power transmitter may output the third detection power 612 having the same amount of power after it outputs the third detection power 611. If the wireless power transmitter outputs the third detection power having the same amount of power as described above, the amount of power of the third detection power may have the amount of power capable of detecting the smallest wireless power receiver, for example, the wireless power receiver of a category 1.

The wireless power transmitter may output the third detection power 612 having the amount of power having the upper limit size after it outputs the third detection power 611. If the wireless power transmitter outputs the pieces of third detection power having different sizes, the amounts of power of the pieces of third detection power may be the amounts of power capable of detecting the wireless power receivers of categories 1 to 5, respectively. For example, the third detection power 611 may have the amount of power capable of detecting the wireless power receiver of the category 5. The third detection power 612 may have the amount of power capable of detecting the wireless power receiver of the category 3. The third detection power 613 may have the amount of power capable of detecting the wireless power receiver of the category 1.

Meanwhile, the second detection power 601 and 602 may be power capable of driving a wireless power receiver. More specifically, the second detection power 601 and 602 may have the amount of power capable of driving the control unit and communication unit of the wireless power receiver.

The wireless power transmitter may apply the second detection power 601 and 602 and the third detection power 611, 612, 613, 614 and 615 to the power reception unit in the second cycle and the third cycle, respectively. If a wireless power receiver is disposed on the wireless power transmitter, impedance viewed from one point of the wireless power transmitter may be changed. The wireless power transmitter may detect a change in the impedance while the second detection power 601 and 602 and the third detection power 611, 612, 613, 614 and 615 are applied. For example, the wireless power transmitter may detect a change in the impedance while it applies the third detection power 615. Accordingly, the wireless power transmitter may detect an object (S507). If an object is not detected (S507-N), the wireless power transmitter may maintain power save mode in which heterogeneous power is periodically applied (S505).

Meanwhile, if impedance is changed and an object is detected (S507-Y), the wireless power transmitter may enter the low power mode. In this case, the low power mode is a mode in which the wireless power transmitter applies driving power having the amount of power capable of driving the control unit and communication unit of a wireless power receiver. For example, as shown in FIG. 6, the wireless power transmitter may apply driving power 620 to the power transmission unit. The wireless power receiver may receive the driving power 620 and drive the control unit and communication unit. The wireless power receiver may perform communication with the wireless power transmitter using the driving power 620 based on a specific method. For example, the wireless power receiver may transmit or receive data required for authentication, and may join a wireless power network controlled by the wireless power transmitter based on the data. In this case, if a foreign object other than a wireless power receiver is disposed, data transmission or reception cannot be performed. Accordingly, the wireless power transmitter may determine whether the disposed object is a foreign object (S511). For example, if the wireless power transmitter does not receive a response from the object during a predetermined time, it may determine the object to be a foreign object.

If the disposed object is determined to be a foreign object (S511-Y), the wireless power transmitter may enter the latch fault mode. For example, the wireless power transmitter may periodically apply first power 631 to 634 in a first cycle in FIG. 6. The wireless power transmitter may detect a change in the impedance while it applies the first power. For example, if the foreign object is recovered, the wireless power transmitter may detect a change in the impedance. The wireless power transmitter may determine that the foreign object has been recovered. Alternatively, if the foreign object has not been recovered, the wireless power transmitter is unable to detect a change in the impedance. The wireless power transmitter may determine that the foreign object has not been recovered. If the foreign object has not been recovered, the wireless power transmitter may notify a user that the current state of the wireless power transmitter is an error state by outputting at least one of a lamp and a warning sound. Accordingly, the wireless power transmitter may include an output unit which outputs at least one of the lamp and the warning sound.

If it is determined that the foreign object has not been recovered (S515-N), the wireless power transmitter may maintain the latch fault mode (S513). Meanwhile, if it is determined that the foreign object has been recovered (S515-Y), the wireless power transmitter may enter the power save mode again (S517). For example, the wireless power transmitter may apply second power 651 and 652 and third power 661 to 665.

Meanwhile, in the case of FIGS. 5 and 6, if a change in the impedance attributable to the disposition of a wireless power receiver is not great, it may be difficult to detect a wireless power receiver.

Figure 7:
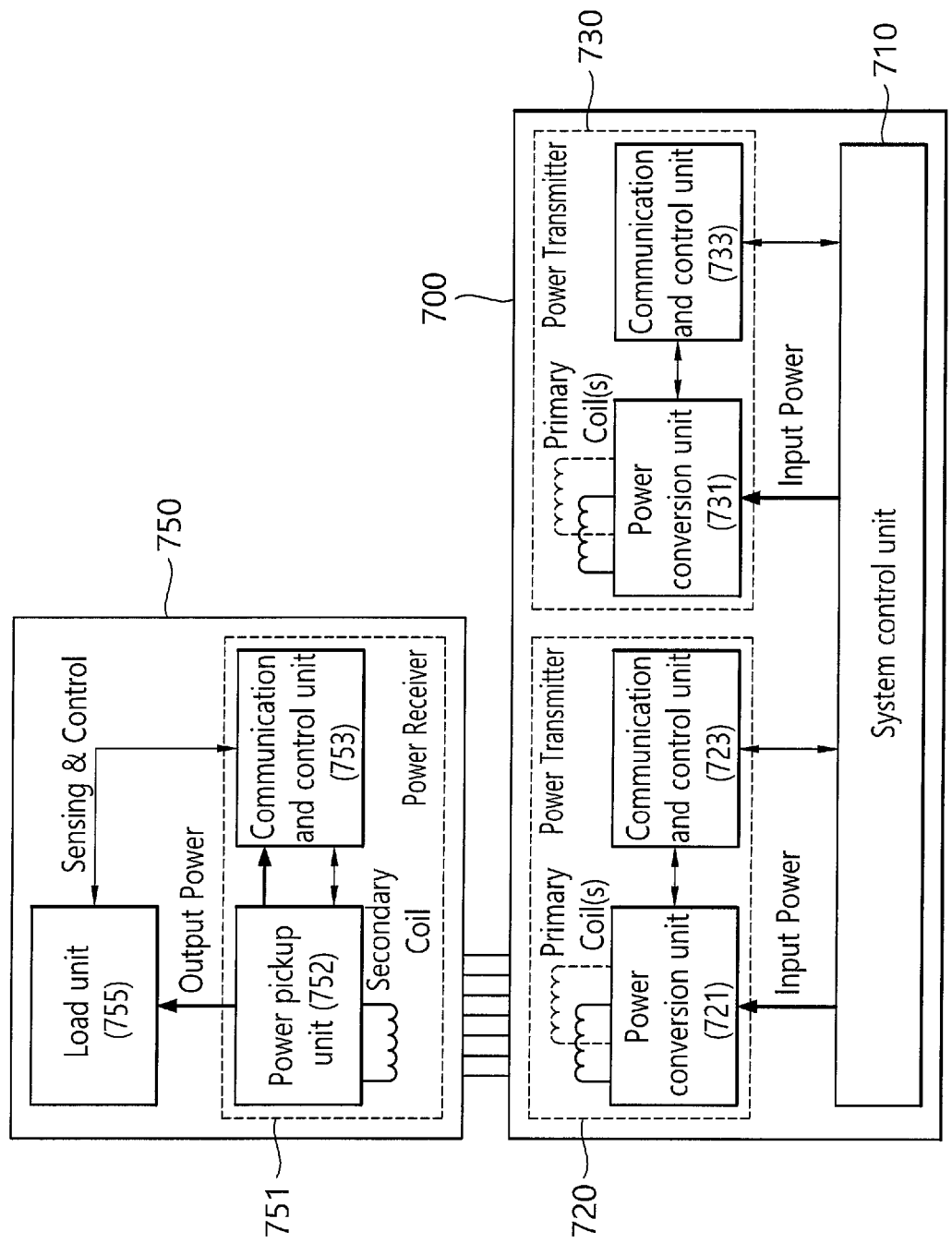
FIG. 7 is a block diagram of a wireless power transmitter and a wireless power receiver according to another embodiment of the present invention.

FIG. 7 is a block diagram of a wireless power transmitter and a wireless power receiver according to another embodiment of the present invention.

Referring to FIG. 7, the wireless power transmitter 700 may include a system control unit 710 and one or more power transmission units 720 and 730. The power transmission units 720 and 730 may include power conversion units 721 and 731 and communication and control units 723 and 733. Furthermore, the wireless power receiver 750 may include a power reception unit 751 and a load unit 755. The power reception unit 751 may include a power pickup unit 752 and a communication and control unit 753.

Each of the power conversion units 721 and 731 may convert electrical power into wireless power, and may transmit the wireless power to the power pickup unit 752 included in the reception unit 751 of the at least one wireless power receiver 750. Each of the power conversion units 721 and 731 may include a primary coil of the magnetic induction method for transmitting wireless power.

The power pickup unit 752 may receive the wireless power from the power conversion units 721 and 731 and convert the received wireless power into electrical power. The power pickup unit 752 may include a secondary coil of the magnetic induction method for receiving wireless power. For example, the power conversion units 721 and 731 and the power pickup unit 752 may maintain the primary coil and the secondary coil in at least one state of a horizontal alignment state and a vertical alignment state, and may transmit or receive wireless power. The primary coil may be a wire-wound type coil, may be a coil array including at least one coil, and may form a coreless resonant transformer part along with a secondary coil.

Meanwhile, the wireless power transmitter 700 may further include an interface surface (not shown) of a flat surface form in order to send wireless power. The at least one wireless power receiver 750 may be placed over the interface surface, and the primary coil may be provided under the interface surface. In this case, small vertical spacing may be formed between the primary coil disposed under the interface surface and the secondary coil of the wireless power receiver 750 disposed over the interface surface so that induction coupling is performed between the primary coil and the secondary coil. The primary coil is described in detail below.

Figure 8:
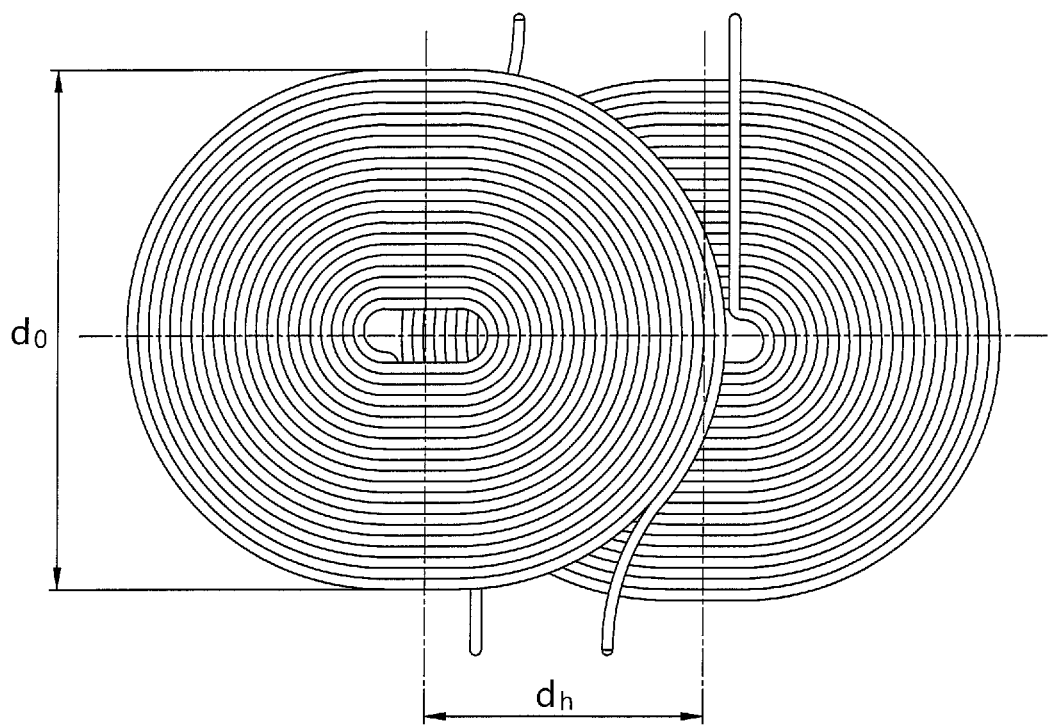
FIG. 8 is a diagram showing an example in which two primary coils are configured.
Figure 9:
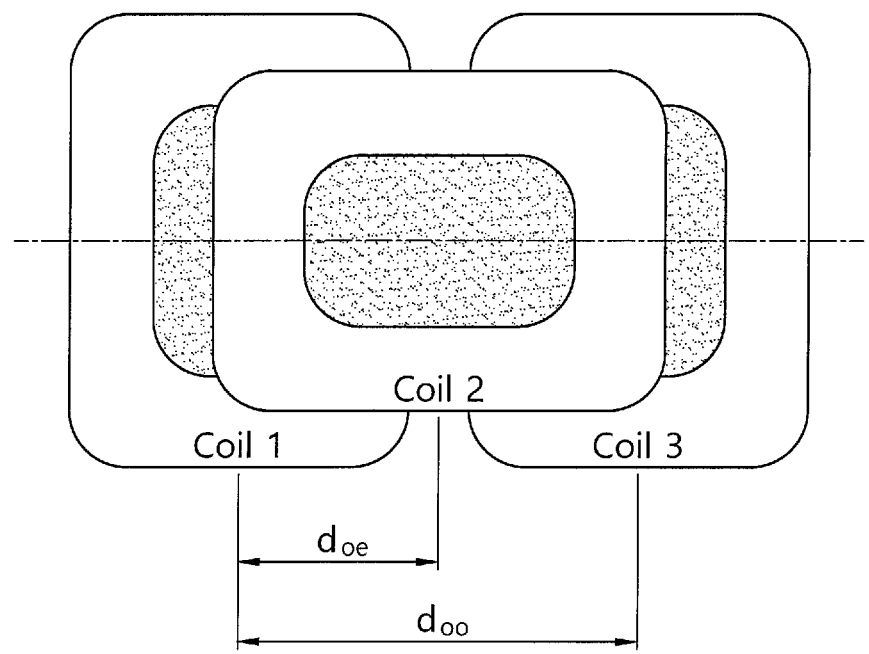
FIG. 9 is a diagram showing an example in which three primary coils are configured.

FIG. 8 is a diagram showing an example in which two primary coils are configured. FIG. 9 is a diagram showing an example in which three primary coils are configured.

Referring to FIG. 8, the two primary coils may be wire-wound type coils. The wire-wound type coil may include a Litz wire having 115 stands and a diameter of 0.08 mm. Furthermore, the two primary coils may have a Racetrack-like shape and may include a single layer. Furthermore, the parameters of the two primary coils may include $d_o$ and $d_h$. $d_o$ may be the external diameter of the primary coil, and $d_h$ may be the distance between the centers of the two primary coils.

Referring to FIG. 9, the three primary coils may include a Litz wire having 105 stands and a diameter of 0.08 mm. Furthermore, the three primary coils may have a rectangular shape and may include a single layer. Furthermore, the parameters of the three primary coils may include $d_{oe}$ and $d_{oo}$. $d_{oe}$ may be the distance between the center of a first primary coil and the center of a second primary coil, and $d_{oo}$ may be the distance between the center of the first primary coil and the center of a third primary coil.

Referring back to FIG. 7, the communication and control unit 723, 733 may perform communication with the at least one power reception unit 752. Furthermore, the communication and control unit 723, 733 may receive a request message for required wireless power from the power reception unit 752. Accordingly, the communication and control unit 723, 733 may control the power conversion unit 721 so that the requested wireless power is transmitted to the power reception unit 752.

The power pickup unit 752 may receive the wireless power from the power conversion unit 721. The load unit 755 may load the received wireless power and charge the battery with the loaded wireless power. The communication and control unit 753 may perform communication with the transmission unit 720, 730 and may perform control so that the wireless power is received from the transmission unit 720, 730. A detailed configuration of the power transmission unit 720, 730 is described below with reference to FIG. 10.

Figure 10:
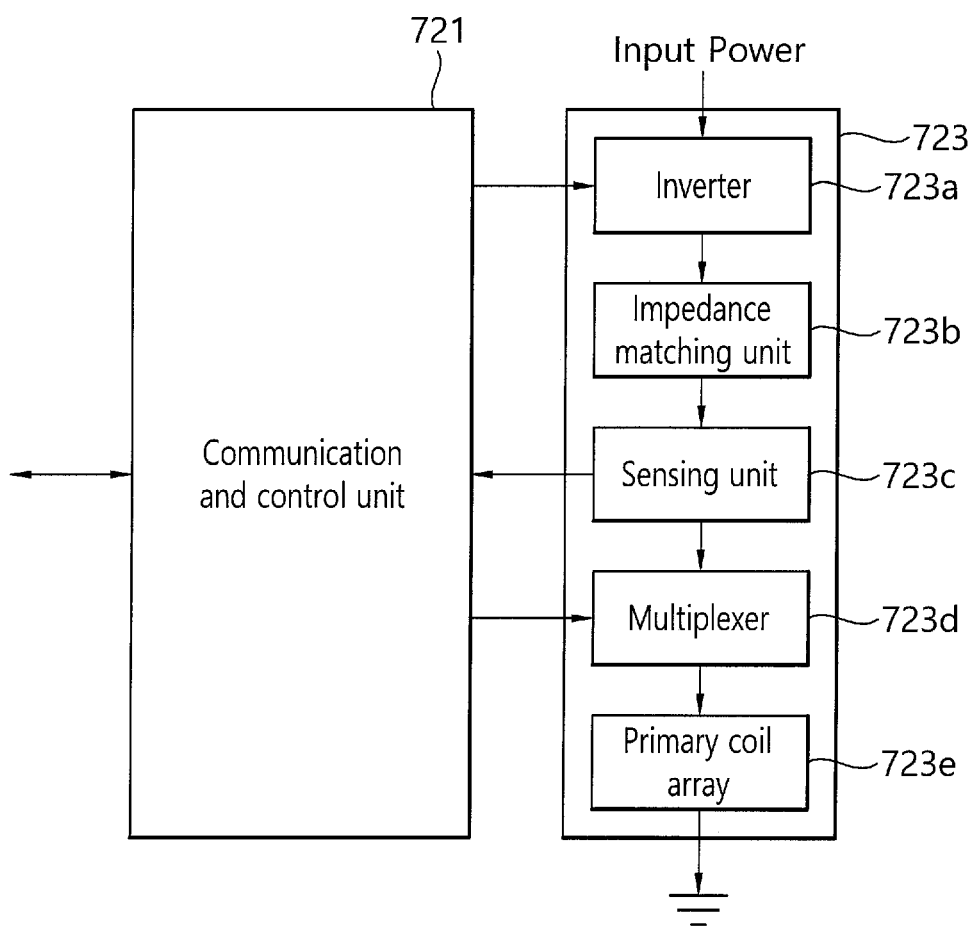
FIG. 10 is a detailed block diagram of the power transmission unit of the wireless power transmitter of FIG. 7 according to an embodiment.

FIG. 10 is a detailed block diagram of the power transmission unit of the wireless power transmitter of FIG. 7 according to an embodiment.

Referring to FIG. 10, the power transmission unit 720, 730 may include the communication and control unit 721 and the power conversion unit 723. The power conversion unit 723 may include an inverter 723a, an impedance matching unit 723b, a sensing unit 723c, a multiplexer 723d and a primary coil array 723e.

In the power conversion unit 723, the inverter 723a may convert digital current (DC) input into an analog current (AC) waveform. The impedance matching unit 723b may perform matching so that a resonant circuit and the primary coil array 723e are connected. Furthermore, the sensing unit may monitor current and a voltage by sensing the current and voltage between the resonant circuit and the primary coil array 723e. The multiplexer 723d may connect or may not connect proper primary coils depending on the location of the power receiver 751.

The communication and control unit 721 may receive a request message for wireless power from the power receiver 751, and may control connection with a proper primary coil array through the multiplexer 723d. Furthermore, the communication and control unit 721 may control the inverter 723a so that the amount of wireless power is adjusted by executing a power control algorithm and protocol, and may control the primary coil array 723e so that the wireless power is transmitted to the power receiver 751. The primary coil array 723e of the power transmission unit 720, 730 is described below with reference to FIG. 11.

FIG. 11 is a diagram showing an example in which the primary coil array of the power transmission unit is configured.

In FIG. 11, (a) is an example showing the top monolayer of a primary coil layer, (b) is an example showing one side of the primary coil array, and (c) is an example showing the top monolayer of the primary coil array.

A primary coil may have a circular shape and a single layer, and the primary coil array may have a plurality of primary coil layers including the area of a hexagonal lattice.

Referring to FIG. 11, the parameters of the primary coil array may include $d_o$, $d_i$, $d_c$, $d_a$, $d_h$, $t_2$ and $t_3$. $d_o$ may indicate the external diameter of the primary coil layer, $d_i$ may indicate the internal diameter of the primary coil layer, $d_c$ may indicate the thickness of the primary coil array, $d_a$ may indicate the thickness of the primary coil array, $d_h$ may indicate the distance between the centers of neighboring primary coil layers, $t_2$ may indicate the offset of a second primary coil layer array, and $t_3$ may indicate the offset of a third primary coil layer array.

Referring back to FIG. 7, the system control unit 710 may control wireless power transmission with the at least one wireless power receiver 750. Accordingly, the wireless power transmitter 700 may transmit wireless power to a plurality of wireless power receivers (not shown). The system control unit 710 which performs the control operation of the wireless power transmitter 700 is described below in detail with reference to FIG. 12.

Figure 12:
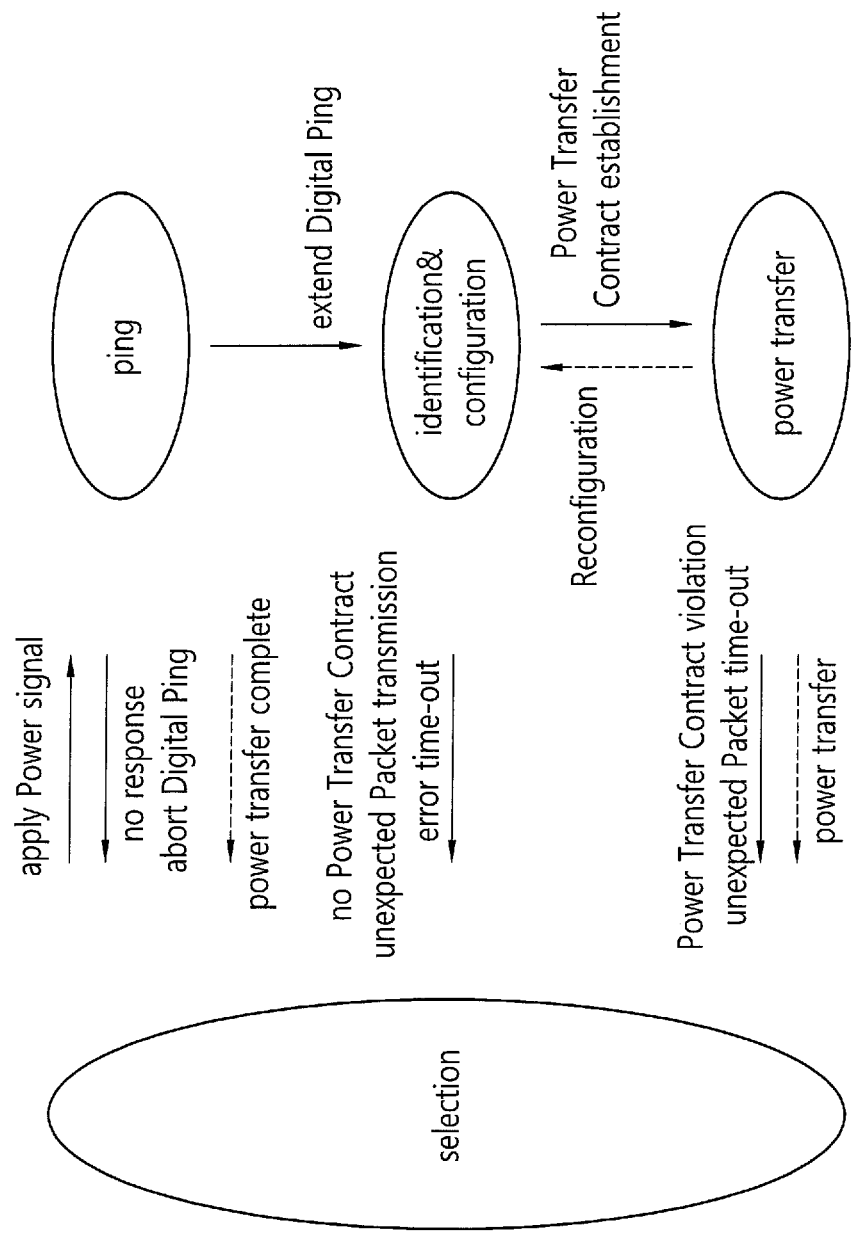
FIG. 12 is a flowchart for illustrating the control operation of the wireless power transmitter.

FIG. 12 is a flowchart for illustrating the control operation of the wireless power transmitter.

Referring to FIG. 12, the control operation of the wireless power transmitter may include a selection step, a ping step, an identification and configuration step, and a power transfer step.

In the selection step, the interface surface for the location and removal of a wireless power receiver may be monitored. For example, in the selection step, at least one wireless power receiver present in a free location may be discovered and monitored. An object (e.g., a foreign object, a key or a coin) other than a wireless power receiver may be identified.

Furthermore, if information about a wireless power receiver is insufficient, in the selection step, related information may be selected by repeatedly performing the ping step and the identification and configuration step. Furthermore, in the selection step, a primary coil that will transfer wireless power to a wireless power receiver may be selected. Furthermore, the selection step may switch to a standby mode if a primary coil is not selected.

In the ping step, digital ping may be executed, and the ping step may wait so that a response to a wireless power receiver is received. Furthermore, in the ping step, if a wireless power receiver is discovered, digital ping may be extended and a level of the digital ping may be maintained. Furthermore, if the digital ping is not extended, the ping step may return back to the selection step.

In the identification and configuration step, a selected wireless power receiver may be identified, and wireless power amount configuration information requested by the wireless power receiver may be obtained. Furthermore, in the identification and configuration step, the extended digital ping may be set so that it is terminated. In order to discover another wireless power receiver, the identification and configuration step may return to the selection step.

In the power transfer step, the requested amount of wireless power may be transmitted to the identified wireless power receiver, and current of the primary coil may be adjusted based on control data. Furthermore, when the transmission of the requested amount of wireless power to the identified wireless power receiver is completed, in the power transfer step, the transmission of the wireless power to the identified wireless power receiver may be stopped.

Figure 13:
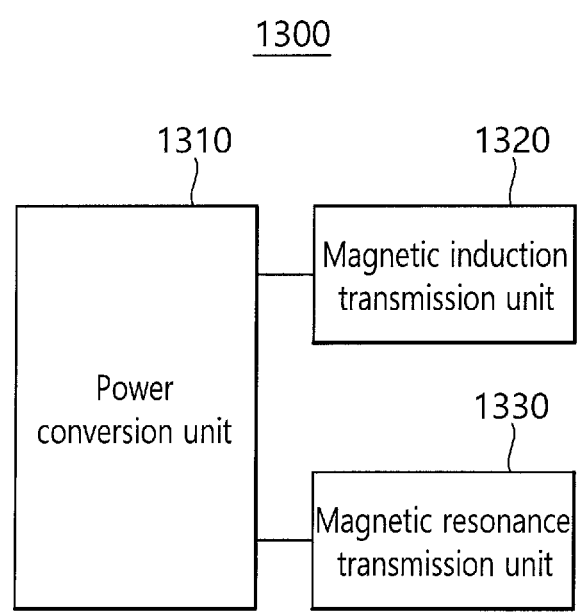
FIG. 13 is a diagram for illustrating the configuration of the power transmission unit according to an embodiment.

FIG. 13 is a diagram for illustrating the configuration of a power transmission unit according to an embodiment.

The power transmission unit 1300 shown in FIG. 13 may include a power conversion unit 1310 including an inverter, a magnetic induction transmission unit 1320 for transmitting power according to the magnetic induction method, and a magnetic resonance transmission unit 1330 for transmitting power according to the magnetic resonance method.

The magnetic induction transmission unit 1320 and the magnetic resonance transmission unit 1330 may become on or off in a time division manner or may become on or off at the same time. Accordingly, the power transmission unit 1300 may transmit power to the wireless power reception apparatus of the magnetic induction method and the wireless power reception apparatus of the magnetic resonance method at the same time.

Figure 14:
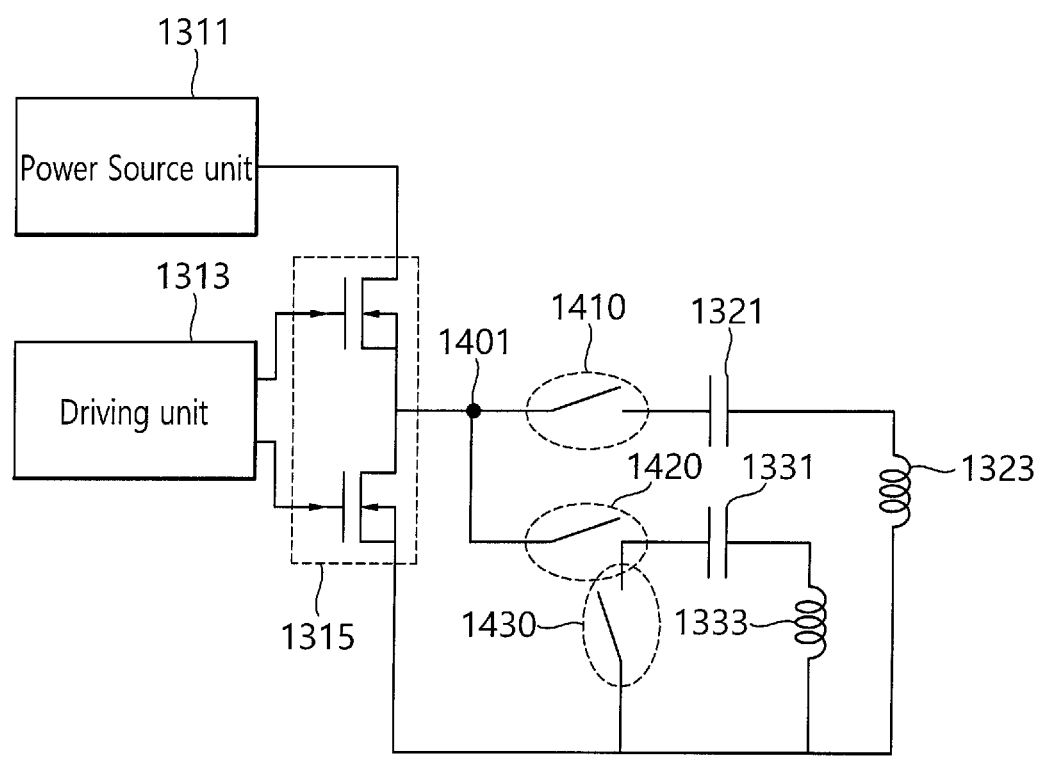
FIG. 14 is a diagram showing an example of a connection relation between the output terminal of an inverter included in the power conversion unit, a magnetic induction transmission unit and a magnetic resonance transmission unit in FIG. 13.

FIG. 14 is a diagram showing an example of a connection relation between the output terminal of the inverter included in the power conversion unit 1310, the magnetic induction transmission unit 1320 and the magnetic resonance transmission unit 1330 in FIG. 13.

Referring to FIGS. 13 and 14, the power transmission unit 1300 may operate in a magnetic induction transmission mode, a magnetic resonance transmission mode or a hybrid mode by controlling a first switch 1410, a second switch 1420 and a third switch 1430. In this case, the hybrid mode may be a mode in which power transfer using the magnetic induction method and power transfer using the magnetic resonance method are performed at the same time.

The wireless power transmission apparatus may perform communication with the wireless power reception apparatus or measure a change in the impedance in order to determine an operation mode of the power transmission unit 1300, and may operate in the hybrid mode at normal times or if the type of wireless power reception apparatus is not clear.

A power unit 1311 applies a DC voltage to a switch unit 1315. A driving unit 1313 outputs an AC voltage to an inverter output terminal 1401 by controlling the switch unit 1315.

The magnetic induction transmission unit 1320 of FIG. 13 may include a first capacitor 1321 and a first inductor 1323.

The magnetic resonance transmission unit 1330 of FIG. 13 may include a second capacitor 1331 and a second inductor 1333.

One end of the first switch 1410 may be connected to the inverter output terminal 1401, and the other end thereof may be connected to the first capacitor 1321.

One end of the second switch 1420 may be connected to the inverter output terminal 1401, and the other end thereof may be connected to the second capacitor 1331.

In the magnetic induction transmission mode, the first switch 1410 may become on, and the second switch 1420 and the third switch 1430 may become off.

In a first magnetic resonance transmission mode, the first switch 1410 may become off and the second switch 1420 may become on.

In a second magnetic resonance transmission mode, the first switch 1410 may become on and the third switch 1430 may become on.

In this case, if the third switch 1430 becomes on, the power transmission unit 1300 always turns on the first switch and always turns off the second switch 1420.

In the magnetic resonance transmission mode, if the third switch 1430 becomes on, the second capacitor 1331 and the second inductor 1333 form a closed loop. In this case, the closed loop may be called a resonator. In the second magnetic resonance transmission mode, energy may be induced from the first inductor 1323 to the second inductor 1333 and then transferred to the wireless power reception apparatus through the resonator.

In the second magnetic resonance transmission mode, the second capacitor 1331 and the second inductor 1333 do not affect the unique resonant frequency of the entire system because they operate as the resonator. Accordingly, in the second magnetic resonance transmission mode, energy may be transferred to the wireless power reception apparatus with higher efficiency compared to the first magnetic resonance transmission mode. Accordingly, the second switch 1320 shown in FIG. 14 may be removed.

The power transmission unit 1300 may operate in the hybrid mode by making the first switch 1410 and the second switch 1420 on or off in a time division manner. Furthermore, the power transmission unit 1300 may operate in the hybrid mode by making the third switch 1430 on or off in a time division manner in the state in which the first switch 1410 becomes always on.

Meanwhile, in FIG. 14, the first capacitor 1321 and the first inductor 1323 may be the equivalent circuits of an induction coil, and may be respectively called first capacitance and second inductance. Likewise, the second capacitor 1331 and the second inductor 1333 may be the equivalent circuits of a resonant coil, and may be respectively called second capacitance and second inductance.

Figure 15:
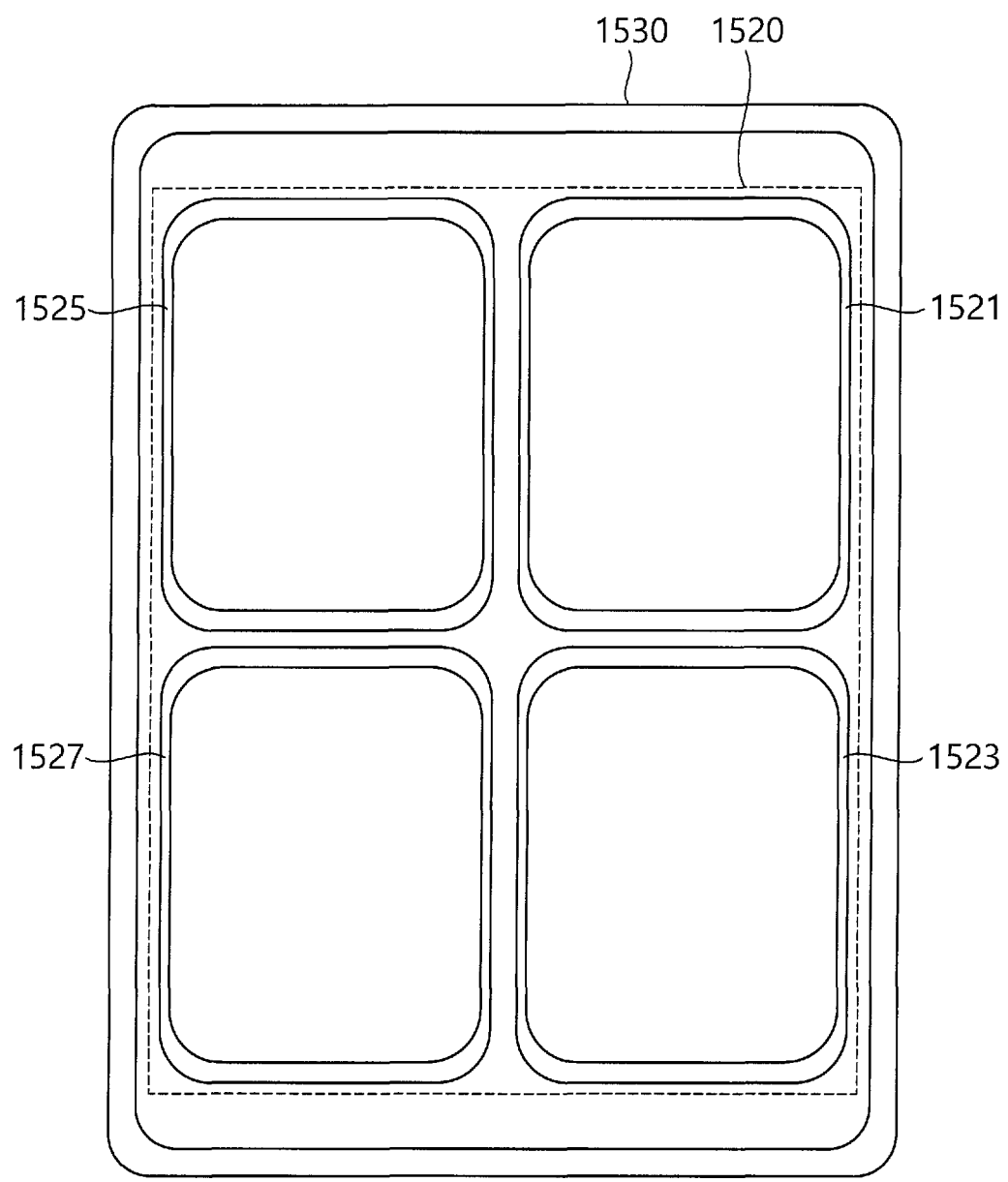
FIG. 15 shows an example of the configuration of the magnetic induction transmission unit and the magnetic resonance transmission unit of FIG. 13.

FIG. 15 shows an example of the configuration of the magnetic induction transmission unit 1320 and the magnetic resonance transmission unit 1330 of FIG. 13.

Referring to FIG. 15, the magnetic induction transmission unit 1320 may include a single coil or a coil array 1520, and the magnetic resonance transmission unit 1330 may include a resonant coil 1530 of a form that surrounds the coil array 1520.

The coil array 1520 may include a plurality of coil cells 1521, 1523, 1525 and 1527. The coil array 1520 may include a plurality of primary coils configured as in FIG. 9 or 11.

In the magnetic induction transmission mode, only some or all of the plurality of coil cells may become on depending on the required amount of power of the wireless power reception apparatus.

Furthermore, if the coil array 1520 includes a plurality of coil cells, only some or all of the plurality of coil cells may become on depending on the required amount of power of the wireless power reception apparatus in the second magnetic resonance transmission mode.

Figure 16:
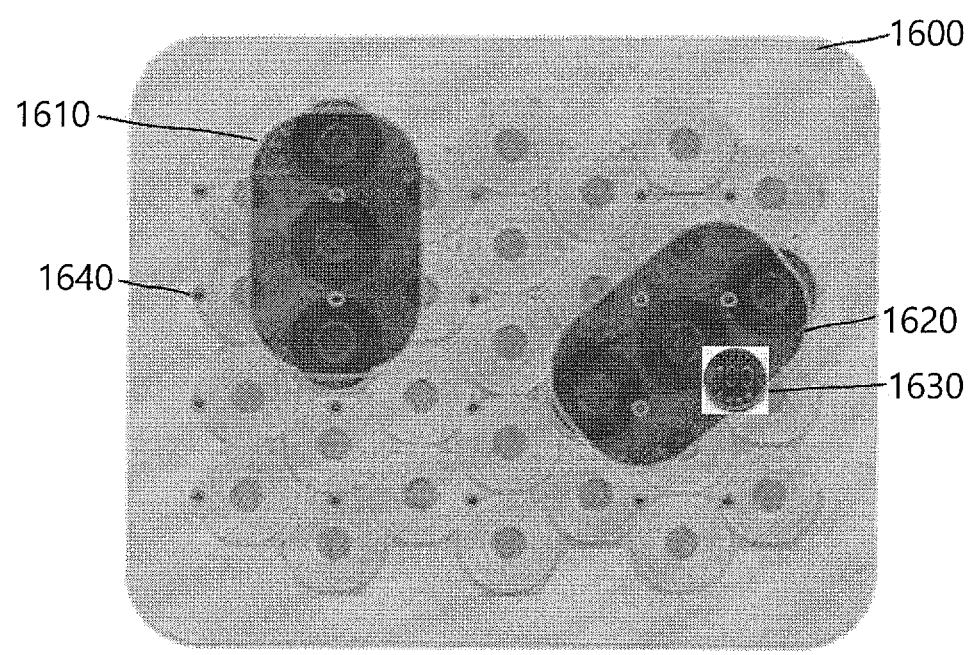
FIG. 16 is a diagram for illustrating a method for controlling the primary coil array of FIG. 11 according to an embodiment.

FIG. 16 is a diagram for illustrating a method for controlling the primary coil array of FIG. 11 according to an embodiment.

As described with reference to FIG. 12, the wireless power transmission apparatus may operate according to the power transfer step after the identification and configuration step.

In this case, in the power transfer step, if a new wireless power receiver appears or a foreign object is present, there is a need for a method for controlling the operation of the primary coil array.

Referring to FIG. 16, the primary coil array 1600 according to an embodiment may include a plurality of primary coils and a plurality of sensors 1640.

In this case, the sensor 1640 may be a pressure sensor or may be a temperature sensor. In other words, the primary coil array 1600 may include a plurality of pressure sensors and a plurality of temperature sensors.

The sensors 1640 may be provided at a plurality of locations of the primary coil array 1600. Accordingly, the wireless power transmission apparatus may detect a new object at a specific location attributable to a change in the pressure and may detect a change in the temperature at a specific location through the sensors 1640.

For example, in the "power transfer" step of transmitting power to a first wireless power reception apparatus 1610 in a first time interval, when a new wireless power reception apparatus 1620 is located at a specific location of the primary coil array 1600, the sensing value of the pressure sensor at the corresponding location may be changed.

In this case, the wireless power transmission apparatus may stop the "power transfer" step and may operate according to the identification and configuration step again.

Meanwhile, in the "power transfer" step, a foreign object 1630 may be located on primary coils that are being driven or on primary coils that are not being driven.

At this time, the wireless power transmission apparatus may detect a rise of temperature at a specific location through a temperature sensor. If the temperature rises to a predetermined threshold or more, the wireless power transmission apparatus may stop driving by making off primary coils (e.g., four coils around the corresponding temperature sensor) that are being driven around the corresponding temperature sensor.

Furthermore, although primary coils around a temperature sensor that has detected a temperature rise are made off, if the temperature does not drop to a threshold or less or rises, the wireless power transmission apparatus may temporarily stop the operation of the entire primary coil array. Furthermore, in order to detect a foreign object, the wireless power transmission apparatus may stop the "power transfer" step and operate according to the identification and configuration step.

In one embodiment, the temperature sensors may be provided only at the three or four places of the entire primary coil array 1600. If three temperature sensors are provided, whether temperature in a cell at what location will rise to a threshold or more may be determined based on the difference between temperatures measured by the three temperature sensors.

For example, if a first temperature sensor, a second temperature sensor and a third temperature sensor are disposed in a triangle and have respective sensing values A, B and C, previously measured values may be stored in a table form based on values A-B, B-C and C-A or absolute values thereof. If the value A-B is the greatest and A is greater than B and has a value equal to or greater than a critical value by a specific value or more, primary coils around A may become off. Alternatively, if A is 25, B is 24.5 and C is 24.6, cells that belong to cells between A and C and that are located at a specific distance or more from B may be set to become off.

Meanwhile, power that may be transmitted for each of primary coils included in the primary coil array 1600 may be limited due to a temperature rise, an electromagnetic wave problem, etc. Accordingly, in order to transfer power to the wireless power reception apparatus, the wireless power transmission apparatus may determine at least one primary coil to be driven, and may start power transfer only if a maximum amount of transmitted power of the primary coil is greater than the required amount of power of the wireless power reception apparatus.

For example, the wireless power transmission apparatus may check the location and required amount of power $P_{request}$ of the wireless power reception apparatus through communication, and may calculate the amount of power $P_{sum}$ transmittable by all of the primary coils to be driven at a corresponding location. In this case, the number of primary coils to be driven may be limited to a predetermined number per one wireless power reception apparatus. The wireless power transmission apparatus may make on corresponding primary coils if $P_{sum}$ is greater than $P_{request}$.

Figure 17:
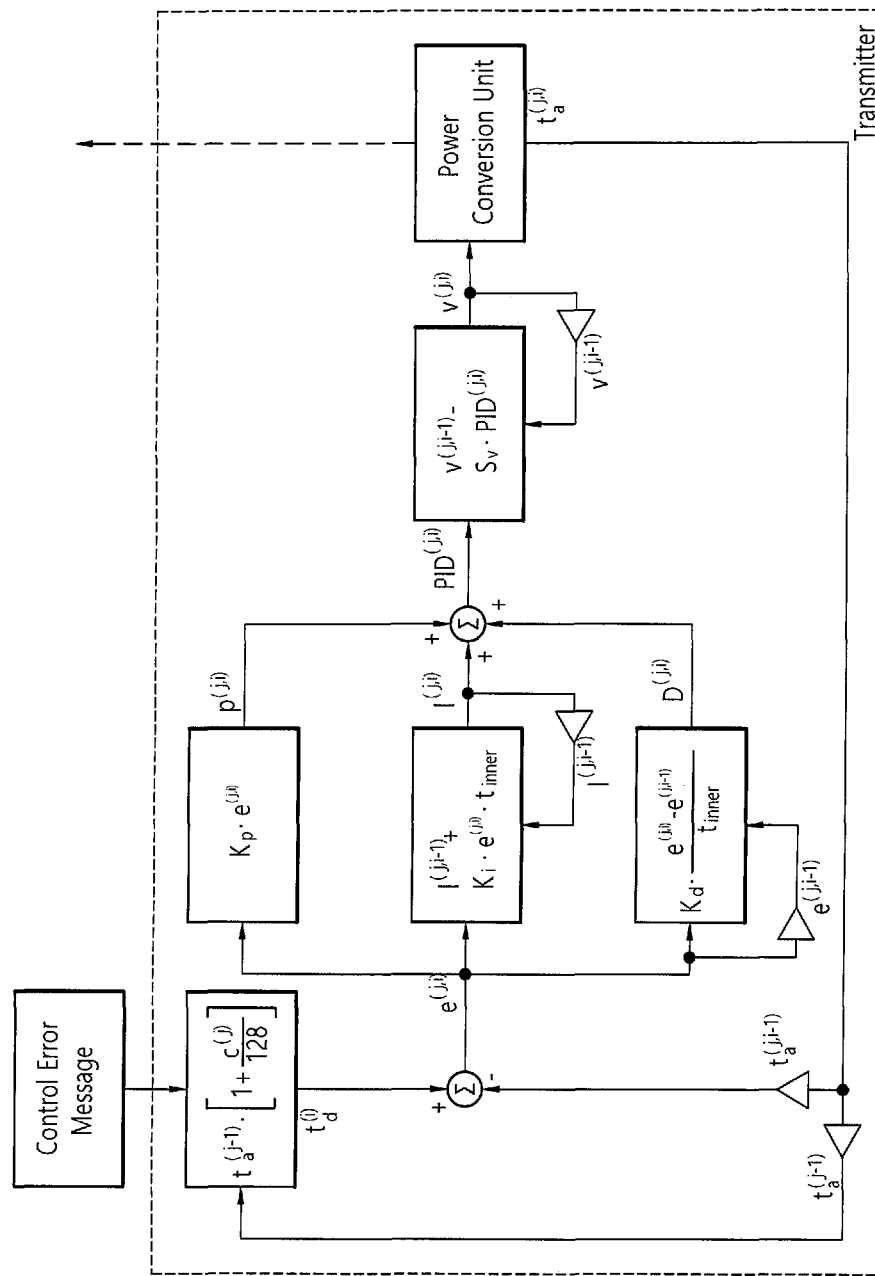
FIG. 17 is a diagram for illustrating the power transfer control algorithm of the wireless power transmission apparatus.

FIG. 17 is a diagram for illustrating the power transfer control algorithm of the wireless power transmission apparatus.

Control of power transfer of the wireless power transmission apparatus may be performed using a proportional integral differential (PID) algorithm. An example shown in FIG. 17 shows an example of the PID algorithm.

In the wireless power transmission system using the magnetic induction method, an example of PID parameters for control of an operating frequency is shown in [Table 1], and an example of PID parameters for control of a duty cycle is shown in [Table 2].

TABLE 1

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms$ |
| Integral term limit | $M_I$ | 3,000 | N.A. |
| PID output limit | $M_{PID}$ | 20,000 | N.A. |

TABLE 2

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms$ |
| Integral term limit | $M_I$ | 3,000 | N.A. |
| PID output limit | $M_{PID}$ | 20,000 | N.A. |
| Scaling factor | $S_v$ | −0.01 | % |

In the power transfer step, the wireless power transmission apparatus may adjust current of a primary coil based on control data. In this case, the control of the current of the primary coil may be performed based on the PID algorithm.

In FIG. 17, an index j=1, 2, 3, . . . indicates the sequence of "control error packets." The "control error packet" indicates a message that is received by the wireless power transmission apparatus from the wireless power reception apparatus in the power transfer step.

When a $j^{th}$ control error packet is received, the wireless power transmission apparatus may calculate a new primary cell current $t_d^{(j)}$ as in Equation 1.

$$t_d^{(j)} = t_d^{(j)} * \left[1 + \frac{c^{(j)}}{128}\right] \quad \text{[Equation 1]}$$

In this case, $c^{(j)}$ indicates a control error value included in the $j^{th}$ control error packet. $t_a^{(0)}$ indicates current first supplied to a primary coil in the power transfer step.

The wireless power transmission apparatus may calculate the difference between the new primary cell current and an actual primary cell current as in Equation 2.

$$e^{(j,i)} = t_d^{(j)} - t_a^{(j,i-1)} \quad \text{[Equation 2]}$$

In this case, $t_a^{(j,i-1)}$ indicates a primary cell current determined in the $(i-1)^{th}$ repetition of a loop. $t_a^{(j,0)}$ indicates the actual primary cell current at the start of the loop. An index i=1, 2, 3, . . . $i_{max}$ indicates the repetition number of a PID algorithm loop.

The wireless power transmission apparatus may calculate a proportional term, an integral term and a derivative term as in Equation 3.

$$P^{(j,i)} = K_p * e^{(j,i)}, \quad \text{[Equation 3]}$$

$$I^{(j,i)} = I^{(j,i-1)} + K_i * e^{(j,i)} * t_{inner},$$

$$D^{(j,i)} = K_d * \frac{e^{(j,i)} - e^{(j,i-1)}}{t_{inner}},$$

In this case, $K_p$ is a proportional gain, $K_i$ is an integral gain, $K_d$ is a derivative gain, and $t_{inner}$ is the time required to perform the PID algorithm loop.

The wireless power transmission apparatus calculates the sum of the proportional term, integral term and derivative term as in Equation 4.

$$PID^{(j,i)} = P^{(j,i)} + I^{(j,i)} + D^{(j,i)} \quad \text{[Equation 4]}$$

In the calculation of Equation 4, the wireless power transmission apparatus needs to limit the sum $PID^{(j,i)}$.

The wireless power transmission apparatus needs to calculate a new value of a controlled variable as in Equation 5.

$$v^{(j,i)} = v^{(j,i-1)} - S_v * PID^{(j,i)} \quad \text{[Equation 5]}$$

In this case, $S_v$ is a scaling factor dependent on the controlled variable.

The new value of the controlled variable is transferred to the power conversion unit. The new value of the controlled variable may be used as the current adjustment limit width of the primary coil.

In accordance with one embodiment, the wireless power transmission apparatus may change the value of a "PID output limit" depending on the number of coils that belong to coils included in the primary coil array and that are being driven.

For example, the wireless power transmission apparatus may increase the value of the "PID output limit" as the number of cells being driven increases and may decrease the value of the "PID output limit" as the number of cells being driven decreases.

Accordingly, the protection and stable power transfer of the wireless power transmission apparatus are possible by adjusting maximum output power of each of coils within a cell.

Furthermore, in accordance with one embodiment, the wireless power transmission apparatus may limit a voltage and duty used for power control based on the number of cells being driven.

The wireless power transmission apparatus may limit power input to the primary coil array depending on the number of coils that belong to coils included in the primary coil array and that are being driven.

Furthermore, the wireless power transmission apparatus may limit output power of the inverter depending on the number of coils that belong to coils included in the primary coil array and that are being driven.

FIGS. 3 to 7 are the descriptions regarding the method for transmitting power using the magnetic resonance method, and FIGS. 8 to 12 show the methods for transmitting power using the magnetic induction method. An example in which power is transmitted using the magnetic resonance method has been described in detail in Conventional Technology 4. Furthermore, FIGS. 13 to 17 show the hybrid method.

In FIGS. 8 to 12, the magnetic induction method may be applied to a mouse pad independently of a main device in a local computing environment and may be used to transmit power to a mouse on the mouse pad.

Figure 18:
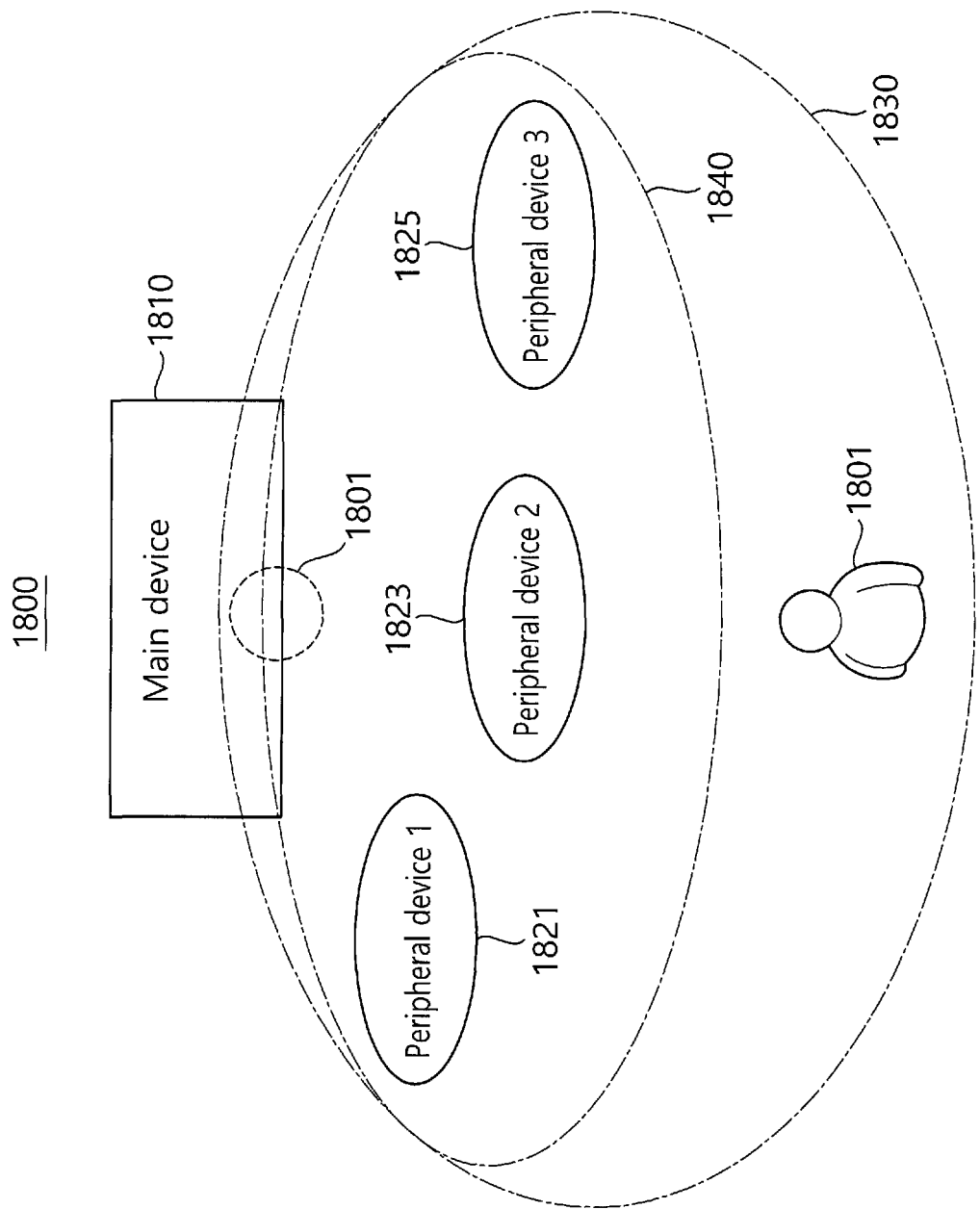
FIG. 18 is a diagram for illustrating a wireless power transmission network environment according to an embodiment.

FIG. 18 is a diagram for illustrating a wireless power transmission network environment according to an embodiment.

Referring to FIG. 18, the wireless power transmission network 1800 includes a main device 1810 and peripheral devices 1821, 1823 and 1825.

The main device 1810 may wirelessly supply power to the peripheral devices 1821, 1823 and 1825.

Accordingly, the main device 1810 may include a wireless power transmitter 1801 capable of transmitting power using at least any one of the magnetic resonance method and the magnetic induction method.

A wireless power transmission network may be formed by power transfer coverage of the main device 1810. The power transfer coverage may be defined as the distance D disclosed in Conventional Technology 3 or Conventional Technology 5.

Hereinafter, the power transfer coverage of the main device 1810 may also be called "power transfer coverage of a wireless power transmission network", for convenience description.

In FIG. 18, reference numeral 1830 indicates power transfer coverage of the main device 1810. For example, reference numeral 1830 may be power transfer coverage formed by maximum transmission power of the wireless power transmitter 1801.

It may not be preferred that a user 1801 is present within the wireless power transmission network because wireless power transfer is not free from a harmfulness problem for the human body. Furthermore, it is necessary to control the power transfer coverage of the wireless power transmission network due to a problem, such as power waste or power transfer efficiency.

For example, the power transfer coverage of the wireless power transmission network may be controlled so that it is adjusted as in reference numeral 1840.

Figure 19:
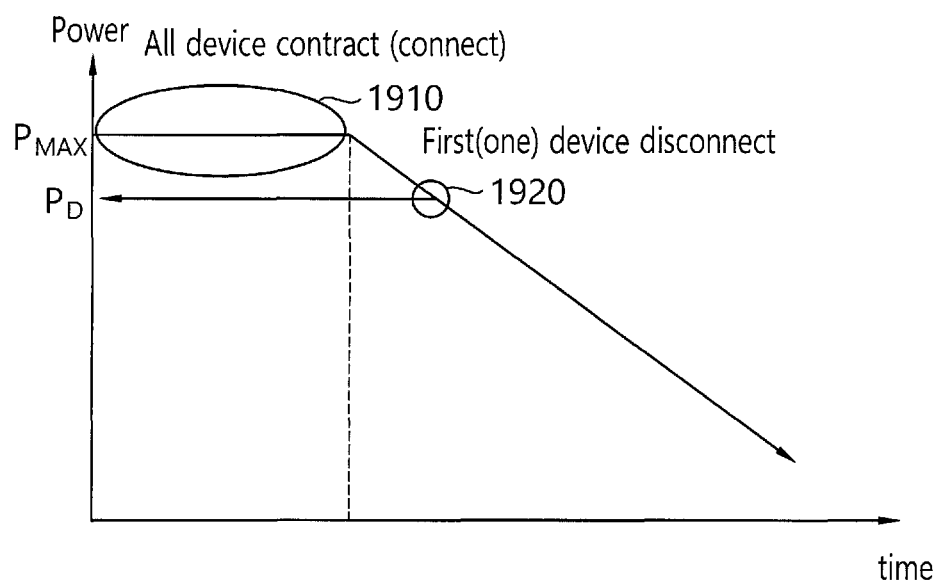
FIG. 19 is a diagram for illustrating a procedure for gradually decreasing the amount of transmission power according to an embodiment.

FIG. 19 is a diagram for illustrating a procedure for gradually decreasing the amount of transmission power according to an embodiment.

In FIG. 18, if the amount of transmission power of the main device 1810 is a maximum value, for example, power transfer coverage may be formed like reference numeral 1830.

In this case, all of the peripheral devices 1821, 1823 and 1825 may be defined to be the state in which they have been connected to a wireless power transmission network. In contrast, power reception efficiency of any one of the peripheral devices 1821, 1823 and 1825 may be reduced to a reference value or less due to a reduction in the amount of transmission power of the main device 1810 or the amount of power received may change to the state in which it is smaller than a required minimum value.

If power reception efficiency of any one of the peripheral devices 1821, 1823 and 1825 is reduced to a reference value or less due to a reduction in the amount of transmission power of the main device 1810 or the amount of power received changes to the state in which it is smaller than a required minimum value, it may be defined to be the state in which any one of the peripheral devices 1821, 1823 and 1825 has been disconnected in a wireless power transmission network.

Furthermore, a peripheral device that has generated communication disconnection from the main device 1810 may be defined to be the state in which it has been disconnected in a wireless power transmission network.

Reference numeral 1910 in FIG. 19 indicates the interval in which all of the peripheral devices 1821, 1823 and 1825 have been connected to a wireless power transmission network.

In the state in which all of the peripheral devices 1821, 1823 and 1825 have been connected to the wireless power transmission network, when the amount of transmission power of the main device 1810 gradually decreases, there may be a device (e.g., the peripheral device 3 of FIG. 18) that is first disconnected from the wireless power transmission network at a specific moment like reference numeral 1920.

First, the amount of power at the moment when the device disconnected from the wireless power transmission network is generated may be defined to be $P_D$ as shown in FIG. 19.

The main device 1810 may determine the amount of transmission power based on the value $P_D$. For example, the main device 1810 may set the amount of transmission power to be greater than the value $P_D$ by a specific value or more or may increase or decrease the amount of transmission power by a predetermined offset value compared to the value $P_D$, may measure the power reception state of a device that has been disconnected from a wireless power transmission network again, and may determine the most proper transmission power value.

Hereinafter, power control of the wireless power transmission system including the plurality of peripheral devices supplied with power from the main device within power transmission coverage of the main device is described below.

In accordance with a standardization technology related to wireless power transmission, the "amount of received power $P_{received}$", that is, one of parameters, may be used to detect a foreign object and a "control error value" may be used for power control. In this case, the amount of received power may be the amount of power received by a secondary coil or may be the amount of power measured at the input terminal of a rectifier. That is, the amount of received power means the value of power actually received by a wireless power receiver other than power lost in a wireless channel.

Meanwhile, the rectifier output voltage Vrect of the wireless power receiver or at voltage Vout at the input terminal of a battery may be a parameter fed back to a wireless power transmitter. In this case, Vrect or Vout may also be used for power control.

However, a conventional technology has not yet proposed a detailed power control algorithm in an environment in which a plurality of wireless power receivers is present or has proposed only a concept that power control is performed by taking into consideration the entire efficiency.

Accordingly, there is a need for power control in which actual operations of a plurality of peripheral devices each including a wireless power receiver have been taken into consideration.

For example, in the wireless power transmission network shown in FIG. 18, if power control is performed based on the peripheral device 3 1825 in the state in which the peripheral device 1 1821 operates using power currently received from the main device 1810, the peripheral device 1 1821 may not operate normally.

In other words, if the main device 1810 performs power control based on a parameter received from the peripheral device 3 1825 and the current consumption power of the peripheral device 1 1821 is the greatest, the operation of the peripheral device 1 1821 may be stopped.

In this case, the power control includes adjusting the amount of current input to the inverter of a power converter, raising output power of the inverter, changing an operating frequency or changing impedance of a resonant circuit.

The power control apparatus according to an embodiment may include the power transmission unit 211, the control unit 212 and the communication unit 213, as shown in FIG. 2.

In this case, the power control apparatus may be included in the wireless power transmitter 1801 of the main device 1810 of FIG. 18. Accordingly, for convenience description, the subject that performs power control may be expressed as a "main device" or a "power control apparatus."

The power transmission unit 211 transmits power by taking into consideration required power of a plurality of peripheral devices. In this case, the "required power" may mean the reference amount of power by which the peripheral device operates. Furthermore, the required power may be rated power or consumption power of the peripheral device.

For example, the power transmission unit 211 may receive information about the required power of each of the plurality of peripheral devices, and may determine the sum of the pieces of required power of the plurality of peripheral devices to be output power.

Furthermore, the power transmission unit 211 may determine the greatest value of the pieces of required power of the plurality of peripheral devices to be output power.

The communication unit 213 receives information necessary for power control from the plurality of peripheral devices. In this case, the information necessary for power control may also be called a power control parameter.

Furthermore, the communication unit 213 may receive information about current charging levels from the peripheral devices.

The control unit 212 determines the actual power consumption state of the plurality of peripheral devices based on the information necessary for power control, determines a reference peripheral device based on the actual power consumption state, and determines output power by taking into consideration the reference peripheral device.

In other words, after starting power transfer to the plurality of peripheral devices, the control unit 212 may receive a power control parameter and adjust output power. In this case, the adjustment of the output power may include not only adjusting the amount of output power, but adjusting the amount of input current of the inverter or adjusting the output voltage of the inverter.

Furthermore, the control unit 213 may determine a reference peripheral device based on information about a current charging level and determine output power based on the power control parameter of the reference peripheral device.

The control unit 213 may determine the output power based on a "control error value", "rectifier output voltage" or "battery or operating circuit input terminal voltage", but may determine a peripheral device having the smallest "control error value", "rectifier output voltage" or "battery or operating circuit input terminal voltage" to be the reference peripheral device.

Furthermore, the control unit 213 may determine a peripheral device having a charging state of a predetermined reference or less or a peripheral device having the lowest current charging level to be the reference peripheral device.

Figure 20:
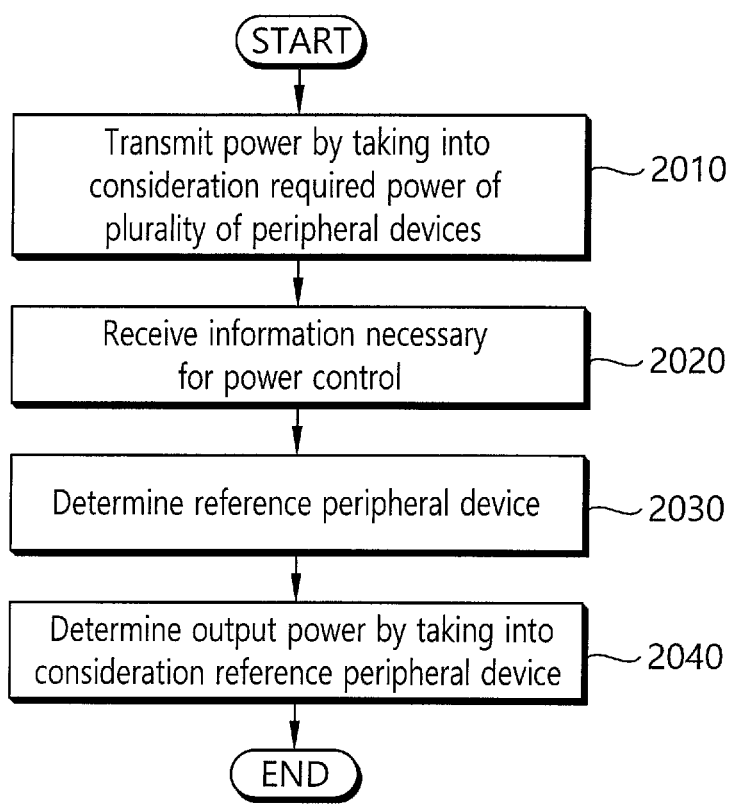
FIG. 20 is a flowchart showing a method for controlling, by a main device, power in a wireless power transmission system according to an embodiment.

FIG. 20 is a flowchart showing a method for controlling power of the main device in the wireless power transmission system according to an embodiment.

Referring to FIG. 20, at step 2010, the main device transmits power by taking into consideration required power of a plurality of peripheral devices.

At step 2020, the main device receives information necessary for power control from the plurality of peripheral devices.

In this case, the information necessary for power control includes at least any one of a "control error value", a "rectifier output voltage" and a "battery or operating circuit input terminal voltage."

At step 2030, the main device determines the actual power consumption state of the plurality of peripheral devices based on the information necessary for power control and determines a reference peripheral device based on the actual power consumption state.

In this case, the main device determines output power based on the "control error value", "rectifier output voltage" or "battery or operating circuit input terminal voltage", but may determine a peripheral device having the greatest "control error value" to be the reference peripheral device or determine a peripheral device having the smallest "rectifier output voltage" or "battery or operating circuit input terminal voltage" to be the reference peripheral device.

For example, the main device may determine a peripheral device having the greatest value of the "control error values" of respective peripheral devices to be a peripheral device having the smallest amount of received power compared to power that is required for a current operation.

Accordingly, the main device may determine a peripheral device having the greatest value of the "control error values" of the respective peripheral devices to be the reference peripheral device, and may perform the power control based on the control error value of the reference peripheral device.

Furthermore, the main device may determine a peripheral device having the smallest value of the "rectifier output voltages" of the respective peripheral devices to be the reference peripheral device, and may perform power control in such a way as to raise the "rectifier output voltage" of the reference peripheral device.

Accordingly, all of peripheral devices can receive power necessary for their operations, and all of peripheral devices included in a wireless power transmission network can perform normal functions.

The information necessary for power control may include information about the actual amount of received power and instant consumption power of the peripheral device.

In this case, the main device may determine a peripheral device having the smallest ratio of the actual amount of received power to the instant consumption power to be a reference peripheral device based on the information about the actual amount of received power and instant consumption power of the peripheral device.

For example, if the peripheral device 1 shown in FIG. 18 has the smallest amount of received power compared to consumption power, the main device may perform power control based on the "control error value" of the peripheral device 1.

If the peripheral device 1 receives power according to the magnetic resonance method, the main device may perform power control for raising a "rectifier output voltage" received from the peripheral device 1.

At step 2040, the main device determines output power by taking into consideration the reference peripheral device.

Meanwhile, the information necessary for power control may be information about a ratio of the actual amount of received power to instant consumption power of a peripheral device.

In other words, a peripheral device may calculate a ratio $P_{received}/P_{instant}$ of the actual amount of received power $P_{received}$ and the instant consumption power $P_{instant}$, and may report the calculated value to the main device. In this case, the main device may determine a peripheral device having the smallest value $P_{received}/P_{instant}$ to be a reference peripheral device.

Meanwhile, the information necessary for power control may be received in a time division manner based on a time interval allocated to each of the plurality of peripheral devices. The main device may perform power control in a time division manner based on information necessary for power control of each of the plurality of peripheral devices.

For example, in a first report time interval, a power control parameter may be received from a first peripheral device. In a first power control interval subsequent to the first report time interval, power control may be performed based on the power control parameter received from the first peripheral device. Next, in a second report time interval subsequent to the first power control interval, a power control parameter may be received from a second peripheral device. In a second power control interval subsequent to the second report time interval, power control may be performed based on the power control parameter received from the second peripheral device.

In this case, in accordance with one embodiment, the interval in which the power control parameter is received and the interval in which the power control is performed may be divided. For example, after all of power control parameters are received from peripheral devices in a time slot divided from a time interval in which a power control parameter is received, power control may be sequentially performed based on first, second and third peripheral devices in the power control interval.

Power control using a time division method may be performed using the procedure for gradually decreasing the amount of transmission power, which is shown in FIG. 19.

For example, as shown in FIG. 19, the amount of power at the moment when a device is first disconnected from a wireless power transmission network may be defined as $P_{D}$. The amount of power at the moment when a device is second disconnected from the wireless power transmission network may be defined as $P_{D2}$. The amount of power at the moment when a device is third disconnected from the wireless power transmission network may be defined as $P_{D3}$.

In this case, for power control using a time division method, the main device may determine output power based on $P_D$ in a first time interval, may determine output power based on $P_{D2}$ in a second time interval, and may determine output power based on $P_{D3}$ in a third time interval.

Figure 21:
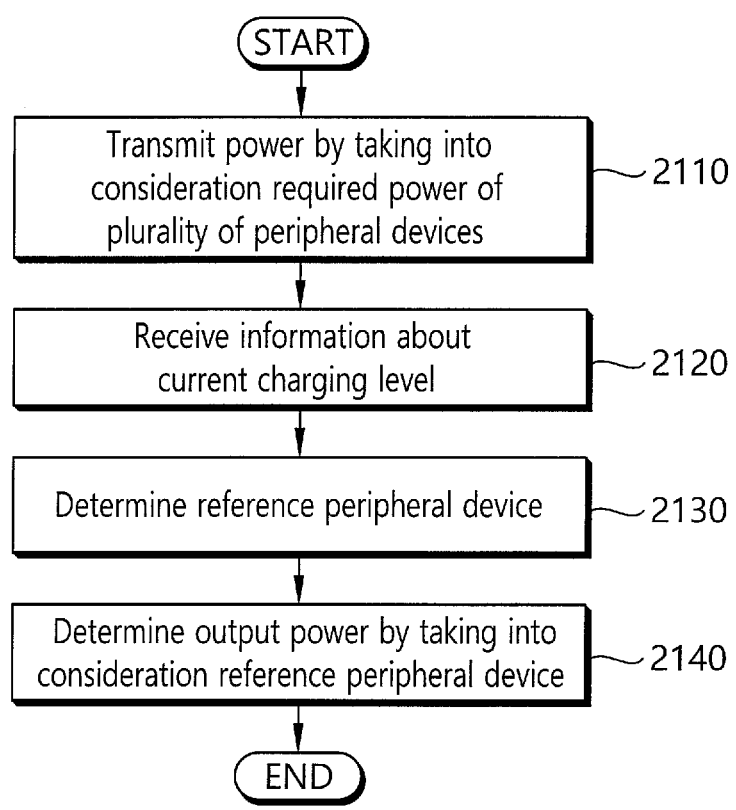
FIG. 21 is a flowchart showing a method for controlling, by a main device, power in a wireless power transmission system according to another embodiment.

FIG. 21 is a flowchart showing a method for controlling, by a main device, power in a wireless power transmission system according to another embodiment.

Referring to FIG. 21, at step 2110, the main device transmits power by taking into consideration required power of a plurality of peripheral devices.

At step 2120, the main device receives information about a current charging level from the plurality of peripheral devices. In this case, the information about a current charging level may be a value itself charged in a capacitor or a battery or may be a normalized level. For example, the information may indicate the amount of charging of 80~90% or more in the case of a normalized level 1, may indicate the amount of charging of 70~80% in the case of a normalized level 2, and may indicate the amount of charging of 60~70% in the case of a normalized level 3.

Furthermore, the charging level may be defined as energy that is currently stored in order for a peripheral device to operate. In this case, the charging level may be a value obtained by subtracting the amount of power consumed for an operation from the accumulated amount of received power.

At step 2130, the main device determines a reference peripheral device based on the information about a current charging level. At step 2140, the main device determines output power based on the power control parameter of the reference peripheral device.

In this case, the main device may determine a peripheral device having a charging state of a predetermined reference or less or a peripheral device having the lowest current charging level to be the reference peripheral device.

Accordingly, the main device may perform power control based on the power control parameter of the reference peripheral device or may perform power control for increasing the amount of received power of the reference peripheral device.

The apparatus described above may be implemented in the form of a combination of hardware components, software components, and/or hardware components and software components. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may include a computer program, code, an instruction or one or more combinations of them and may configure the processing device so that it operates as desired or may instruct the processing device independently or collectively. Software and/or data may be interpreted by the processing device or may be embodied in a machine, component, physical device, virtual equipment or computer storage medium or device of any type or a transmitted signal wave permanently or temporarily in order to provide an instruction or data to the processing device. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter. The hardware device may be configured in the form of one or more software modules for executing the operation of the embodiment, and the vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

The invention claimed is:

1. A method for controlling wireless power transmission, comprising:
transmitting wireless power from a wireless power transmitter to a plurality of peripheral devices within a power transmission coverage of the wireless power transmitter;
receiving, by a power control apparatus, a plurality of control error values from the plurality of peripheral devices;
gradually decreasing an amount of transmission power of the wireless power transmitter until a power reception efficiency of a first peripheral device of the plurality of peripheral devices is reduced below a threshold value;
selecting, by the power control apparatus, the first peripheral device to be a reference peripheral device; and
adjusting, by the power control apparatus, the wireless power transmitted to the plurality of peripheral devices by an amount based, at least in part, on the amount of transmission power when the power reception efficiency of the first peripheral device is reduced below the threshold value and one or more control error values from the reference peripheral device.

2. The method of claim 1, wherein the adjusting the wireless power provided to the plurality of peripheral devices comprises adjusting the wireless power according to the formula:

$$t_d^{(j)} = t_d^{(j-1)} \cdot \left[1 + \frac{c^{(j)}}{128}\right]$$

where:
$c^{(j)}$ is a control error value for a $j^{th}$ control error packet,
$t_a^{(j-1)}$ is a previous output current for a primary coil of the wireless transmitter, and
$t_d^{(j)}$ is an adjusted output current for the primary coil.

3. The method of claim 1, wherein the power control apparatus operates in a first mode and a second mode, wherein the plurality of peripheral devices comprises a first plurality of peripheral devices, and wherein:
the first mode comprises:
the selecting, by the power control apparatus, the first peripheral device to be the reference peripheral device, and
the adjusting, by the power control apparatus, the wireless power transmitted to the plurality of peripheral devices by an amount based, at least in part, on the one or more control error values from the reference peripheral device; and
the second mode comprises:
receiving power control information from a second plurality of peripheral devices in a time division manner based on a time interval allocated to each of the second plurality of peripheral devices, and
controlling the wireless power in the time division manner based on the power control information of each of the second plurality of peripheral devices.

4. The method of claim 3, wherein the power control information includes, for each of the second plurality of peripheral devices, at least one parameter selected from a group consisting of a control error value, a rectifier output voltage, and a battery or operating circuit input terminal voltage.

5. The method of claim 3, wherein the power control information includes, for each peripheral device of the second plurality of peripheral devices, a control error value, rectifier output voltage, or battery or operating circuit input terminal voltage.

6. The method of claim 3, wherein the power control information includes information about an amount of received power of each peripheral device of the second plurality of peripheral devices and instant consumption power of each peripheral device of the second plurality of peripheral devices.

7. The method of claim 3, wherein the power control information includes a ratio of an actual amount of received power to instant consumption power for each of the second plurality of peripheral devices.

8. The method of claim 3, wherein the power control information includes a current charging level for each of the second plurality of peripheral devices.

9. The method of claim 3 further comprising:
determining actual power consumption states of the second plurality of peripheral devices based on the power control information from the second plurality of peripheral devices; and
wherein controlling the wireless power is based on a comparison of the respective power consumption states of each of the second plurality of peripheral devices.

10. The method of claim 1, wherein the adjusting the wireless power of the wireless power transmitter includes causing the wireless power to be transmitted by a resonant circuit of the wireless power transmitter to the plurality of peripheral devices within the power transmission coverage of the wireless power transmitter.

11. The method of claim 1, wherein the wireless power transmitter is configured to transmit the wireless power to the plurality of peripheral devices via electromagnetic induction or via a resonant frequency signal.

12. The method of claim 1, wherein a control error value of the plurality of control error values comprises a value determined based, at least in part, on an amount of power received by a peripheral device compared to an actual amount of power consumed by the peripheral device.

13. The method of claim 1, wherein a control error value of the plurality of control error values comprises a value determined based, at least in part, on an amount of power measured at an input terminal of a rectifier.

14. A wireless power transmission system, comprising:
a wireless power transmitter configured to transmit wireless power to a plurality of peripheral devices within a power transmission coverage of the wireless power transmitter;
a communication unit comprising one or more first processors configured to receive a plurality of control error values from the plurality of peripheral devices; and
a control unit comprising one or more second processors configured to operate in a first mode to:
gradually decrease an amount of transmission power of the wireless power transmitter until a power reception efficiency of a first peripheral device of the plurality of peripheral devices is reduced below a threshold value,
select the first peripheral device to be a reference peripheral device, and
adjust the wireless power transmitted by the wireless power transmitter, based at least in part, on the amount of transmission power when the power reception efficiency of the first peripheral device is reduced below the threshold value and one or more control error values received from the reference peripheral device and transmit the wireless power to the peripheral devices.

15. The wireless power transmission system of claim 14, wherein the control unit is configured to operate in a second mode,
wherein the plurality of peripheral devices comprises a first plurality of peripheral devices, and
wherein in the second mode, the control unit is configured to:
receive power control information from a second plurality of peripheral devices in a time division manner based on a time interval allocated to each of the second plurality of peripheral devices, and
control the wireless power in the time division manner based on the power control information of each of the second plurality of peripheral devices.

16. The wireless power transmission system of claim 15, wherein the power control information includes information about an amount of received power and instant consumption power for each of the plurality of peripheral devices.

17. The wireless power transmission system of claim 15, wherein the power control information includes a ratio of an amount of received power to instant consumption power for each of the plurality of peripheral devices.

18. The wireless power transmission system of claim 15, wherein the power control information includes a current charging level received from each of the plurality of peripheral devices.

19. The wireless power transmission system of claim 14, wherein the control unit is configured to adjust the wireless power according to the formula:

$$t_d^{(j)} = t_a^{(j-1)} \cdot \left[1 + \frac{c^{(j)}}{128}\right]$$

where:
$c^{(j)}$ is a control error value for a $j^{th}$ control error packet,
$t_a^{(j-1)}$ is a previous output current for a primary coil of the wireless transmitter, and
$t_d^{(j)}$ is an adjusted output current for the primary coil.

* * * * *